United States Patent
Jones et al.

(10) Patent No.: US 8,799,348 B2
(45) Date of Patent: Aug. 5, 2014

(54) PODCAST ORGANIZATION AND USAGE AT A COMPUTING DEVICE

(71) Applicant: Apple Inc., Cupertino, CA (US)

(72) Inventors: Anne Jones, Emerald Hills, CA (US); Mike Wiese, Cupertino, CA (US); David Lawrence Neumann, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/781,715

(22) Filed: Feb. 28, 2013

(65) Prior Publication Data

US 2013/0238640 A1 Sep. 12, 2013

Related U.S. Application Data

(62) Division of application No. 11/476,414, filed on Jun. 27, 2006, now Pat. No. 8,412,763.

(60) Provisional application No. 60/805,449, filed on Jun. 21, 2006.

(51) Int. Cl.
G06F 15/16 (2006.01)

(52) U.S. Cl.
USPC ............ 709/201; 709/202; 709/23; 709/204; 709/234

(58) Field of Classification Search
USPC .................. 709/201, 202, 203, 204, 234
See application file for complete search history.

(56) References Cited

U.S. PATENT DOCUMENTS

| 2006/0015524 A1* | 1/2006 | Gardiner et al. | 707/102 |
| 2007/0061393 A1* | 3/2007 | Moore | 709/201 |
| 2007/0112837 A1* | 5/2007 | Houh et al. | 707/102 |
| 2007/0240030 A1* | 10/2007 | Cronstrom | 715/500.1 |
| 2007/0245020 A1* | 10/2007 | Ott | 709/225 |

* cited by examiner

*Primary Examiner* — Liangche A Wang
*Assistant Examiner* — Cheikh Ndiaye
(74) *Attorney, Agent, or Firm* — Novak Druce Connolly Bove + Quigg LLP

(57) ABSTRACT

Improved techniques that facilitate the use of podcasts are disclosed. The improved techniques can pertain to publishing, hosting, accessing, subscribing, managing, organizing, searching, browsing, transferring, and/or playing podcasts. According to one aspect, tags are embedded into syndication feeds (e.g., RSS feeds) that may be made available for distribution by an online media store to facilitate the management of podcasts. In accordance with one embodiment, an explicit tag may be embedded at the feed and/or episode level to indicate that the feed and/or episode includes explicit content. In accordance with another embodiment, a duration tag may be embedded at the episode level to indicate an estimated duration associated with the episode. Upon downloading the episode, the duration may be replaced by the actual duration of the episode. In accordance with yet another embodiment, a new feed-URL tag may be embedded in a syndication feed to identify a new URL at which the feed is to be accessed.

11 Claims, 23 Drawing Sheets

FIG. 5A

| Title 802 | URL 804 | Blocked? 806 |
|---|---|---|
| Beyer Weaver & Thomas | http://www.beyerlaw.com | N |
| Ebay | http://www.ebay.com | Y |
| | | |

FIG. 8

Single category: 1702

```
<itunes:category text="Audio Blogs" />   1702
```

Category with ampersand: 1704

```
<itunes:category text="Movies & Television" />
```

Category with Subcategory: 1706

```
<itunes:category text="Arts & Entertainment">
<itunes:category text="Games" />
</itunes:category>
```

Entry with multiple categories: 1708

```
<itunes:category text="Arts & Entertainment">
<itunes:category text="Games" />
</itunes:category>
<itunes:category text="Technology">
<itunes:category text="Computers" />
</itunes:category>
```

FIG. 17

| Source | Podcast | | Time | Release Date ▼ | Size | Description | Category |
|---|---|---|---|---|---|---|---|
| Library | ▽ Aimee Mann: Music and Interviews [SUBSCRIBE] | | 18:01 | 1/24/06 | 4.2 MB | Conversation with Aimee Mann and mu.. | |
| Podcasts | ☑ Shadowboxing with Aimee Mann Part 3 | | | 1/24/06 | Not av.. | | |
| Videos | ▷ AlloCine: Movie Trailers [SUBSCRIBE] | | | 3/30/06 | | | |
| Party Shuffle | ▷ Amateur Traveler Podcast (iTunes enh..) [CLEAN] | | 30:16 | 3/31/06 | 15.6 MB | Travel for the love of it: travel stories.. | Travel |
| Radio | ▷ CBC Radio 3 Podcast | | 54:29 | 3/31/06 | 52 MB | 100% Independent Canadian Music | Music |
| Music Store | ▷ DMZ {VIDEO} | | 8:23 | 4/8/06 | 43.6 MB | FreedomZone Presents..the freedom.. | Music |
| Purchased | ▷ FlashTV | | 5:20 | 3/31/06 | 19.3 MB | The Official Podcast for Independent.. | Entertainment |
| 90's Music | ▷ iTunes New Music Tuesday | | 12:38 | 4/3/06 | 12.2 MB | The hottest new music each week | Music |
| My Top Rated | ▷ KCRW's Bookworm | | 29:15 | 3/30/06 | 13.5 MB | Intellectual, accessible, and provocative.. | Arts & Entertainment |
| Recently Added | ▷ KCRW's Design and Architecture | | 28:58 | 3/21/06 | 13.4 MB | Design and architecture in Los Angeles.. | Arts & Entertainment |
| Recently Played | ▷ KCRW's Morning Becomes Eclectic | | 37:21 | 4/6/06 | 25.8 MB | Eclectic and dynamic musical adventure.. | Music |
| Top 25 Most Played | ▷ KCRW's Morning Becomes Eclectic Video | | 0:14 | 4/6/06 | 412.2 KB | Eclectic and dynamic musical adventure.. | Music |
| 10,000 Maniacs;Natalie Me... | ▷ KCRW's Today's Top Tune [SUBSCRIBE] | | 4:26 | 4/10/06 | 5.2 MB | | |
| Coverflow | ▷ MosaicSF: Yes, San Francisco. | | 22:10 | 4/6/06 | 30.5 MB | MosaicSF is a Podcast that uncovers the.. | Arts & Entertainment |
| Eurythmics - Annie Lennox | ▷ MTV News Raw (Video) | | 3:48 | 4/3/06 | 13.6 MB | Get the real scoop from your favorites.. | Music |
| | ▷ NPR: All Songs Considered | | 15:00 | 4/20/06 | 97.7 KB | Music Highlights More NPR podcasts at.. | Music |
| | ▷ NPR: Music | | 20:51 | 3/29/06 | 9.6 MB | Music. The best of Morning Edition. All.. | Music |
| | ▷ They Might Be Giants Podcast | | 24:21 | 3/27/06 | 16.8 MB | The official podcast of They Might Be.. | Music |
| | ▷ Tiki Bar TV (video) [EXPLICIT] | | 4:53 | 3/23/06 | 25.6 MB | Forbidden cocktails in a swank pad. | Comedy |
| | Podcast Directory Report a Concern | | | | | [Unsubscribe] [Settings] | |

FIG. 18B

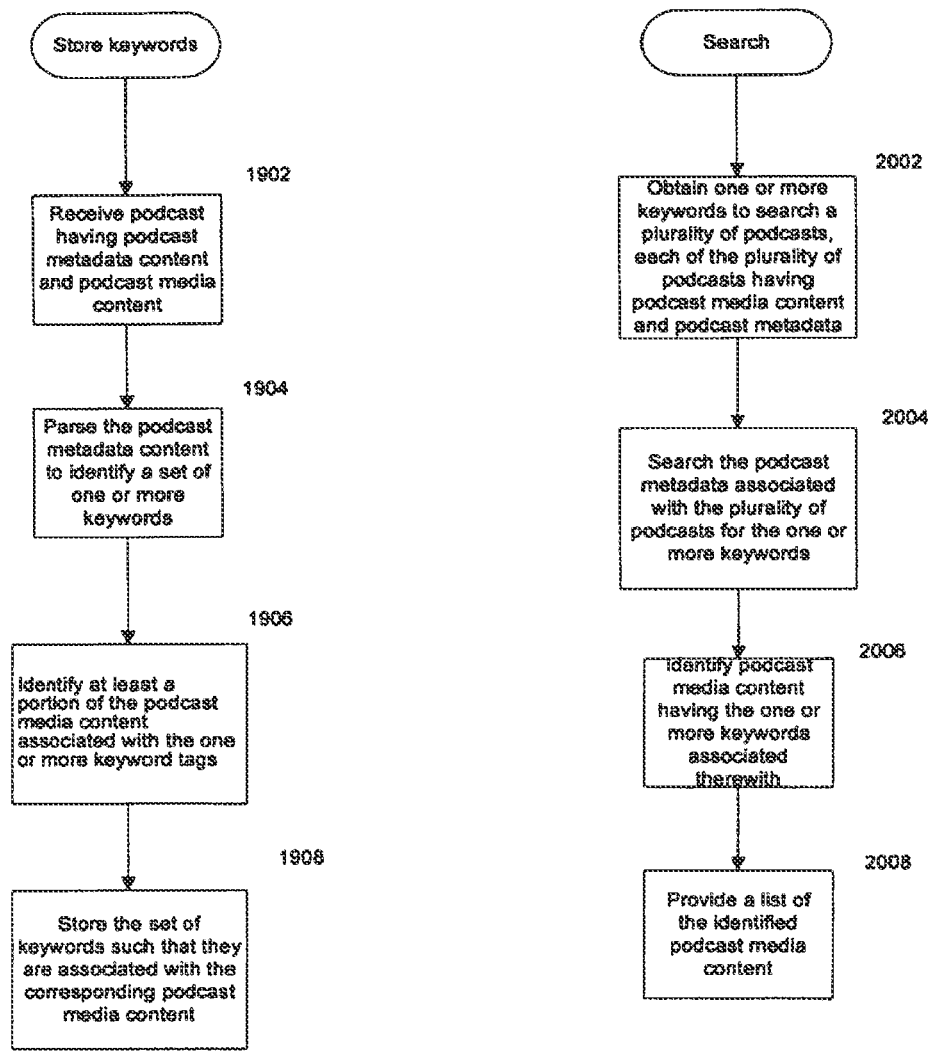

PODCAST ORGANIZATION AND USAGE AT A COMPUTING DEVICE

CROSS-REFERENCE TO RELATED APPLICATIONS

This application is a divisional application of U.S. patent application Ser. No. 11/476,414, entitled "PODCAST ORGANIZATION AND USAGE AT A COMPUTING DEVICE", filed on Jun. 27, 2006, which claims priority from U.S. Provisional Application No. 60/805,449, entitled "MANAGEMENT AND ORGANIZATION OF POD-CASTS", filed on Jun. 21, 2006, which are hereby incorporated by reference herein.

This application is related to: (i) U.S. patent application Ser. No. 13/073,825, filed on Mar. 28, 2011, now Pat. No. 8,180,895 and entitled "MANAGEMENT OF PODCASTS", which is hereby incorporated by reference herein; and (ii) U.S. patent application Ser. No. 11/476,415, filed on Jun. 27, 2006, now Pat. No. 8,516,035 and entitled "BROWSING and SEARCHING OF PODCASTS", which is hereby incorporated by reference herein.

This application is also related to: (i) U.S. patent application Ser. No. 11/166,332, filed on Jun. 25, 2005 and entitled "ACQUISITION, MANAGEMENT AND SYNCHRONIZATION OF PODCASTS", which is hereby incorporated by reference herein; (ii) U.S. patent application Ser. No. 11/166,333, and entitled "UTILIZATION OF PODCASTS ON PORTABLE MEDIA DEVICES", which is hereby incorporated herein by reference; (iii) U.S. patent application Ser. No. 11/166,331, and entitled "TECHNIQUES AND SYSTEMS FOR SUPPORTING PODCASTING", which is hereby incorporated by reference herein; (iv) U.S. patent application Ser. No. 11/114,914, filed Apr. 25, 2005, and entitled "PUBLISHING, BROWSING, RATING AND PURCHASING OF GROUPS OF MEDIA ITEMS", which is hereby incorporated herein by reference; (v) U.S. patent application Ser. No. 11/115,090, filed Apr. 25, 2005, and entitled "PUBLISHING, BROWSING AND PURCHASING OF GROUPS OF MEDIA ITEMS", which is hereby incorporated herein by reference; (vi) U.S. patent application Ser. No. 10/832,984, filed Apr. 26, 2004, and entitled "GRAPHICAL USER INTERFACE FOR BROWSING. SEARCHING AND PRESENTING MEDIA ITEMS"; (vii) U.S. patent application Ser. No. 11/138,004—, filed May 25, 2005, and entitled "ON-LINE PURCHASE OF DIGITAL MEDIA BUNDLES"; (viii) U.S. patent application Ser. No. 10/832,812, filed Apr. 28, 2004, and entitled "METHOD AND SYSTEM FOR SECURE NETWORK-BASED DISTRIBUTION OF CONTENT"; (ix) U.S. patent application Ser. No. 10/833,267, filed Apr. 26, 2004, and entitled "METHOD AND SYSTEM FOR NETWORK-BASED PURCHASE AND DISTRIBUTION OF MEDIA"; and (x) U.S. patent application Ser. No. 11/221,351, filed Sep. 5, 2005, and entitled "PARENTAL CONTROL GRAPHICAL USER INTERFACE," which is hereby incorporated herein by reference.

BACKGROUND OF THE INVENTION

1. Field of the Invention

The present invention relates to podcasts and, more particularly, to acquiring, managing, and organizing podcasts.

2. Description of the Related Art

A media player stores media assets, such as audio tracks, that can be played or displayed on the media player. One example of a portable media player is the iPod® media player, which is available from Apple Computer, Inc. of Cupertino, Calif. Often, a media player acquires its media assets from a host computer that serves to enable a user to manage media assets. In managing media assets, a user can create playlists for audio tracks. These playlists can be created at the host computer. Media assets within the playlists can then be copied to the media player. As an example, the host computer can execute a media management application to create and manage media assets. One example of a media management application is iTunes® produced by Apple Computer. Inc.

Podcasts are typically used to share content from websites. Podcasts are typically associated with Really Simple Syndication (RSS) feeds, which use a lightweight XML format. A podcast can be organized into episodes much like a radio or television program. An interested person can subscribe to receive podcast episodes that are subsequently published. This is achieved by the interested person using their computer to access a podcast website that hosts the RSS feed. The interested person can then subscribe to the RSS feed such that their computer occasionally re-visits the podcast website to check for any new podcast episodes. Typically, if a new podcast episode is available, it is downloaded to the computer. Thereafter, the interested user can play the podcast episode at their computer in the same manner as other audio files (e.g., MP3 files). A utility program can be used to download the audio files to a portable media player (e.g., MP3 player). One example of such a conventional utility program is "iPodder," which is a small program that runs on one's computer to download audio files to one's portable media player.

Unfortunately, podcasts are conventionally not easily managed. Podcasts often dynamically change as new episodes are released. Management of such dynamic media assets is complicated. Additionally, to the extent that a host computer desires to support a portable media player, the host computer needs to manage the transfer of podcast data to the portable media player. In addition, due to the increase in the number of podcasts that are available, it has become more difficult to manage and organize the podcasts.

Thus, there is a need for techniques to manage and organize podcasts on computers.

SUMMARY OF THE INVENTION

The invention pertains to improved techniques that facilitate the use of podcasts. The improved techniques can pertain to creating, publishing, hosting, accessing, subscribing, organizing, managing, transferring, searching, browsing, and/or playing podcasts.

The invention can be implemented in numerous ways, including as a method, system, device, apparatus (including graphical user interface), or computer readable medium. Several embodiments of the invention are discussed below.

According to one aspect, one or more tags are embedded into syndication feeds (e.g., RSS feeds) that support the syndication of podcasts that may be made available for distribution by an online media store. In accordance with one embodiment, the tags are embedded in the podcast metadata content of the syndication feed rather than the podcast media content (e.g., media file).

According to another aspect, upon receiving a syndication feed, the podcast metadata content of the feed is parsed to identify the embedded tag(s) and corresponding value(s). In addition, the podcast media content that corresponds to the tag(s) is identified. Information associated with the parsed metadata content (e.g., tag value(s)) is then associated with the corresponding media content. This may be accomplished, for example, by storing this information in a table, database, or other suitable data structure. The tag values may also be embedded into metadata of the corresponding media content (e.g., media file) in order to enable a client device receiving the media file to obtain the pertinent metadata.

According to another aspect, tags are embedded into syndication feeds that may be made available for distribution by an online media store to facilitate the management of podcasts. These tags include the explicit tag (e.g., <explicit> tag), the duration tag (e.g., <duration> tag), and the new-feed-URL tag (e.g., <new-feed-URL> tag).

In accordance with one embodiment, an explicit tag may be embedded in the podcast metadata content of a podcast to indicate whether the entire feed contains explicit content or whether an episode contains explicit content. Since an explicit tag may be embedded at the feed and episode levels, a syndication feed may include multiple explicit tags. An indicator of the value of an explicit tag (or lack thereof) may be stored, provided to the user via a visual display, and/or inserted into the metadata of the corresponding episode(s).

In accordance with another embodiment, a duration tag may be embedded in the podcast metadata content of a podcast to indicate a duration (e.g., approximate duration) of a particular episode. Therefore, a syndication feed may include multiple duration tags, where each duration tag corresponds to a different episode of the podcast. Upon obtaining the approximate duration, this value may be provided to the user via a visual display, as well as stored. Once selected and downloaded, the actual duration of an episode may be calculated, provided to the user via a visual display, and stored. For instance, the actual duration may replace the approximate duration that was previously obtained from the podcast metadata content. In addition, the actual duration may be embedded in the metadata of the corresponding episode, enabling a client device receiving the episode to easily ascertain the actual duration of the episode.

According to yet another embodiment, a new-feed-URL tag may be embedded in a syndication feed to identify a new URL to be associated with a particular podcast or episode. Upon obtaining the new URL, the new URL may be associated with the corresponding podcast or episode(s), as well as inserted into the metadata of the corresponding podcast media content (e.g., media file). In this manner, a user may access a podcast without needing to be aware of the new location of the podcast.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 5A is an exemplary screen shot illustrating the presentation of a duration associated with a podcast episode.

FIG. 8 is an exemplary table that may be used to identify those feeds or episodes that have been blocked.

FIG. 17 is exemplary computer-readable code for generating multiple categories and nested categories in accordance with one embodiment of the invention.

FIG. 18B is an exemplary graphical user interface that may be used to display information associated with a podcast or episode.

FIG. 19 is a process flow diagram illustrating a method of associating podcast media content with one or more keywords in accordance with one embodiment of the invention.

FIG. 20 is a process flow diagram illustrating a method of searching podcasts according to keywords in accordance with one embodiment of the invention.

DESCRIPTION OF THE INVENTION

The invention pertains to improved techniques that facilitate management, organization and use of podcasts. The improved techniques can pertain to creating, publishing, hosting, accessing, subscribing, organizing, managing, transferring, searching, browsing, and/or playing podcasts.

In accordance with various embodiments of the invention, tags are embedded in syndication feeds (e.g., RSS feeds) that support the syndication of podcasts that are to be made available for distribution via a server. For instance, the server may be associated with a website enabling podcasts to be distributed via an online media store. In some embodiments, tags are embedded in syndication feeds to facilitate management of the syndication feeds. In other embodiments, tags are embedded in syndication feeds to facilitate the organization, browsing and searching of the syndication feeds. In the following description, the disclosed embodiments are described with reference to RSS feeds. However, it is important to note that these examples are merely illustrative, and therefore other types of syndication feeds or mechanisms may be implemented.

Embodiments of the invention are discussed below with reference to FIGS. 1-20. However, those skilled in the art will readily appreciate that the detailed description given herein with respect to these figures is for explanatory purposes as the invention extends beyond these limited embodiments.

Figure 1:
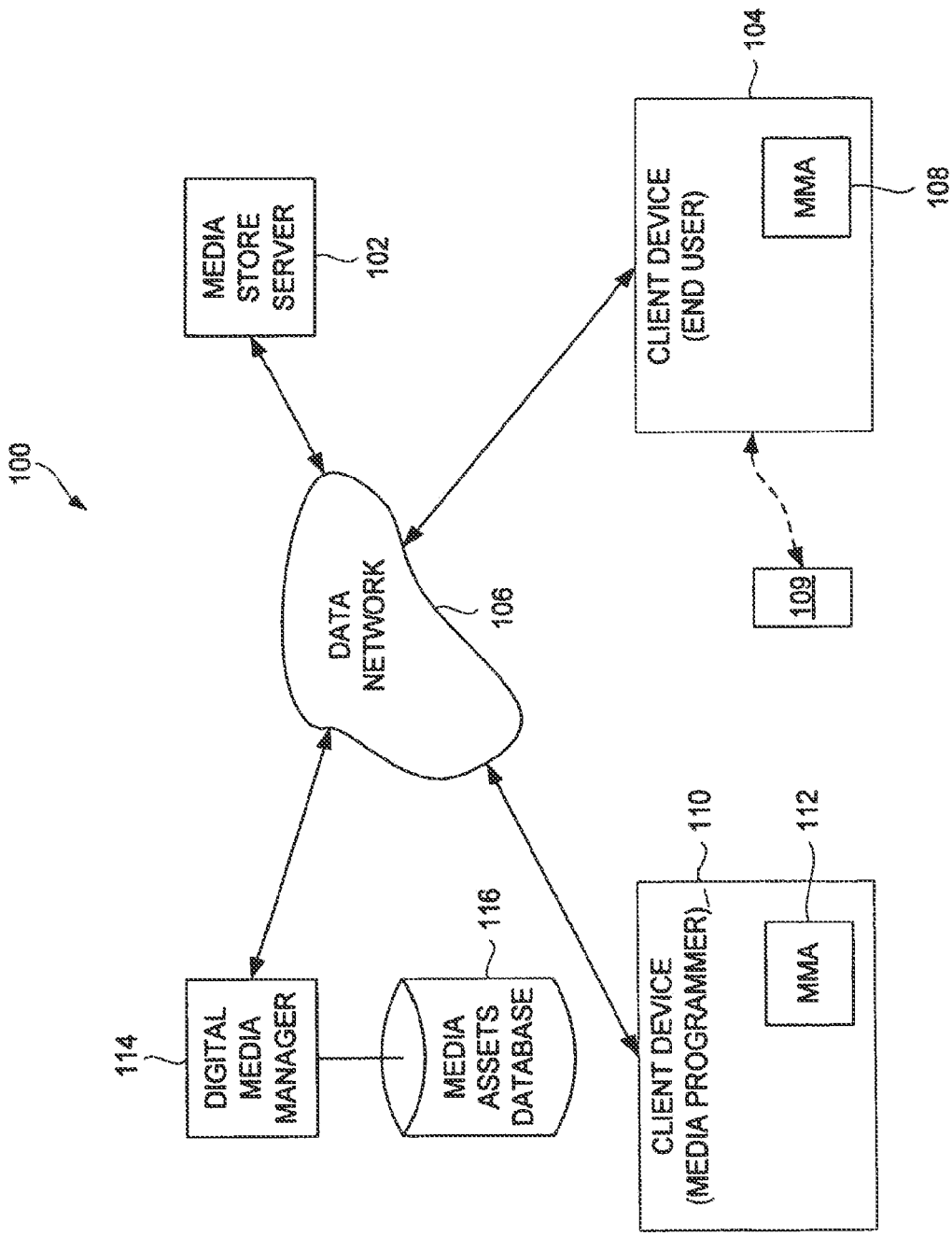
FIG. 1 is a block diagram of a media system according to one embodiment of the invention.

FIG. 1 is a block diagram of a media system 100 according to one embodiment of the invention. The media system 100 includes a media store server 102 that hosts an on-line media store. The media store server 102 can off-load commerce transactions and/or delivery of purchased digital media assets to other servers, if desired. As shown in FIG. 1, the media system 100 includes one or more client devices 104 for use by end users. The client devices 104 couple to a data network 106. Additionally, the media store server 102 also couples to the data network 106. In one implementation, the data network 106 can refer to one or more data networks, typically, high data-bandwidth networks, namely, wired networks, such as the Internet, Ethernet, gigabit Ethernet, and fiber optic, as well as wireless networks such as IEEE 802.11(a), (b) or (g) (WiFi), IEEE 802.16 (WiMax), and Ultra-Wide Band (UWB).

A computer program 108 (client or client application), typically a media management application (MMA) or other media player application, runs on the client device 104. One example of a media management application is the iTunes® application, produced by Apple Computer, Inc. of Cupertino, Calif. The client devices 104 are, in general, computing devices. As an example, the client devices 104 can be specific or general-purpose personal computers (or even portable media players). The client device 104 can couple to a portable media device 109 (portable media player). One example of a portable media player suitable for use with the invention is the iPod®, also produced by Apple Computer, Inc. The computer program 108 can be used by a consumer for a variety of purposes, including, but not limited to, browsing, searching, acquiring and/or purchasing media assets (including podcasts) from the on-line media store provided by the media store server 102, creating and sharing media asset groups (e.g., playlists), organizing media assets, presenting/playing media assets, transferring media assets between client devices 104, and synchronizing with portable media devices 109.

In addition, the computer program 108 can also be used to facilitate the processing and management of podcasts. More particularly, the computer program 108 may enable a podcast or metadata (e.g., tags) associated with a podcast to be parsed and obtained for use in managing the podcast. Such metadata may include, for example, a new URL at which the podcast (or episode) is available, as well as information indicating whether the podcast (or episode) contains explicit content or the approximate duration of the podcast (or episode).

Moreover, the computer program 108 can also be used to facilitate the organization, browsing, and searching of podcasts. More particularly, the computer program 108 may enable a podcast or metadata (e.g., tags) associated with a podcast to be parsed and obtained for use in facilitating the organization, browsing and searching of the podcast. Such metadata may include, for example, one or more categories in which the podcast (or episode(s)) is to be categorized, as well as one or more keywords to be associated with the podcast (or episode(s)).

Once metadata is obtained, the computer program 108 may store the metadata or otherwise alter the manner in which the podcast is stored or categorized. For instance, the metadata may be stored in association with the podcast in a table or other suitable data structure. The metadata may also be stored in a header portion of the podcast media content (e.g., episode) of the podcast that is downloaded.

The media system 100 can also include one or more client devices 110 for use by media programmers. The client devices 110 also run a computer program 112, typically a media management application (MMA) or other media player application. The computer program 112 can be the same as the computer program 108, though the computer program 112 might offer additional functionality for support of the media programmer. As an example, the media programmer that uses the computer program 112 might provide additional functionality for creating and publishing podcasts.

The media system 100 also includes a digital asset manager 114. The digital asset manager 114 is coupled to a media assets database 116. The media assets database 116 stores media asset information including metadata relating to digital media assets available for purchase at the on-line media store. The metadata can pertain to individual media assets (digital media assets) or media asset groups (digital media asset groups). Media assets can include, but are not limited to, music, video, text, and/or graphics files. One particular type of media asset or media asset group is a podcast, which often includes audio, graphics and text (but could also include video). In the case of music, a media asset group can be a playlist for the music. One specific example of a type of digital media asset group is referred to as an iMix™, which is a published playlist currently available for browsing and/or purchase on Apple Computer's iTunes® Music Store. Another specific example of a type of digital media asset group is referred to as an iEssential™, which is a published playlist created by a media programmer and currently available for browsing and/or purchase on Apple Computer's iTunes® Music Store. Still another specific example of a type of digital media asset group is referred to as a Celebrity Playlist, which is a published playlist created by a celebrity and which could be made available for browsing and/or purchase on Apple Computer's iTunes® Music Store.

The digital asset manager 114 is configured to store media asset information including metadata relating to digital media assets available for purchase at the on-line media store to the media assets database 116. In addition, the digital asset manager 114 is also capable of retrieving media asset information from the media assets database 116, as well as deleting media asset information from the media assets database. For example, the metadata may include a new network address (e.g., URL) at which the podcast (or episode) is available. The metadata may also include information indicating whether the podcast (or episode) contains explicit content or the duration of the podcast (or episode). Other examples of metadata include one or more categories in which the podcast (or episode) is to be categorized, as well as one or more keywords to be associated with the podcast (or episode). It may also be desirable to include other information in the metadata, such as information indicating whether a podcast (or episode) is to be blocked from being accessed via the media store.

The media store server 102 enables the user of a particular client device 104 to acquire media assets (e.g., podcasts). Subsequently, the client device 104 can download the media assets from the media store server 102, the digital media manager 114, or some other server, via the data network 106. As will be understood by those familiar with data networks, other network configurations are possible. Furthermore, while the media store server 102 and the digital asset manager 114 are shown as individual and separate devices, it will be understood by those familiar with the art that other configurations are possible. As one example, each device can be implemented such that it is distributed over multiple server computers. As another example, these various servers and/or managers can be implemented by a single physical server computer.

Once a podcast has been published, the podcast can become available on a media store (on-line media store). The media store can host or not host the podcast. If the media store stores all or most of the podcast content, then the podcast can be considered hosted by the media store. On the other hand, if the media store only maintains metadata for the podcast, then the media store does not host the podcast. When the media server does not host the podcast, a third-party server can host the podcast and the media store accesses the podcast feed as appropriate to acquire any data it needs. When the media server does host the podcast, the media server may generate the appropriate syndication feed. A client device would access the podcast feed from the hosting server to acquire (i.e., download) podcast data it desires to store locally. Hence, in one case the media store holds the content of the podcast, and in another the media store does not hold the content of the podcast. In either instance, the media store maintains metadata associated with podcasts that are available on the media store. Using this metadata, the media store may organize and manage the podcasts. In many cases, the organizing and managing can be automated.

When a client subscribes to a podcast, the client receives podcast media content (e.g., episodes) associated with the podcast. Once the episodes of the podcasts have been stored at the client device, some or all of the episodes can be copied to a portable media player that can operatively connect to the client device. In order to ensure that the episodes are correctly identified, organized and managed, the corresponding metadata is maintained at the client device. For instance, the metadata may be maintained in a table or other suitable data structure. In addition, in order to enable the episodes that are copied to a portable media player or other location to be properly identified, organized, and managed, the corresponding metadata may also be stored in the metadata (e.g., header) portion of each corresponding episode file.

In some embodiments, tags are embedded in the metadata of RSS feeds to facilitate management of the RSS feeds. In one embodiment, the RSS feeds are markup language documents (e.g., files) that contain various tags and corresponding values or files (e.g., media content files). These tags may include, for example, the new-feed-URL tag explicit tag, duration tag, and block tag. Methods of processing these tags will be described in further detail below with reference to FIGS. 2A-8.

Podcast owners occasionally need to move their RSS feed from one location to another. When a RSS feed is moved to a new server, the URL to the RSS feed changes. This may be performed by embedding a new-feed-URL tag (e.g., <new-feed-URL>) into the metadata of an RSS feed. By using this tag, a media server (e.g., media store) will understand that there is a new location and update its location (e.g., network address or URL) in accordance with the new feed URL. An exemplary feed format for the new-feed-URL tag is as follows:

<tunes:new-feed-url>http://newlocation.com/example.rss</itunes:new-feed-url>

Thus, the new-feed-URL tag may be inserted one or more times in the RSS feed. Each new-feed-URL tag may be inserted in association with a URL identifying a new location of the feed or an episode.

Figure 2A:
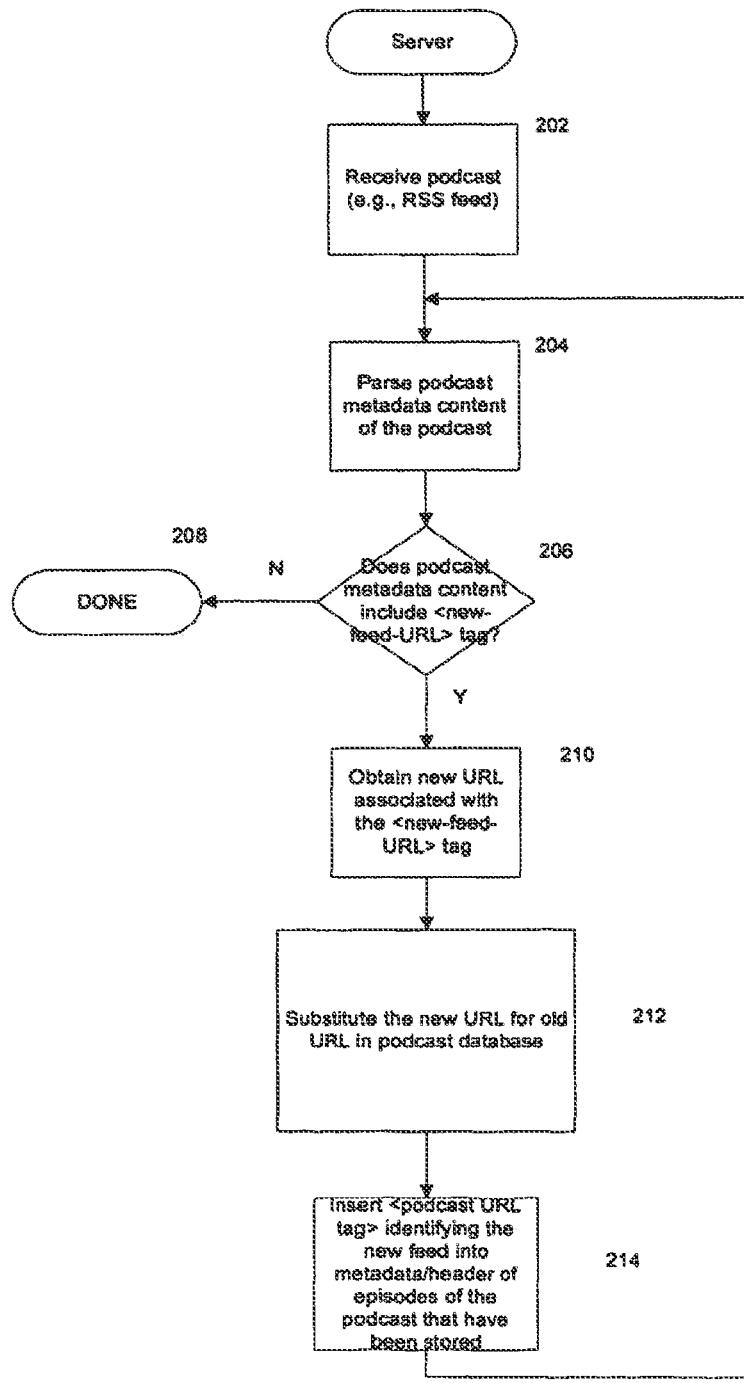
FIGS. 2A-2C are process flow diagrams illustrating methods of processing a new-feed-URL tag to move the location of an RSS feed in accordance with one embodiment of the invention.
Figures 2B, 2C:
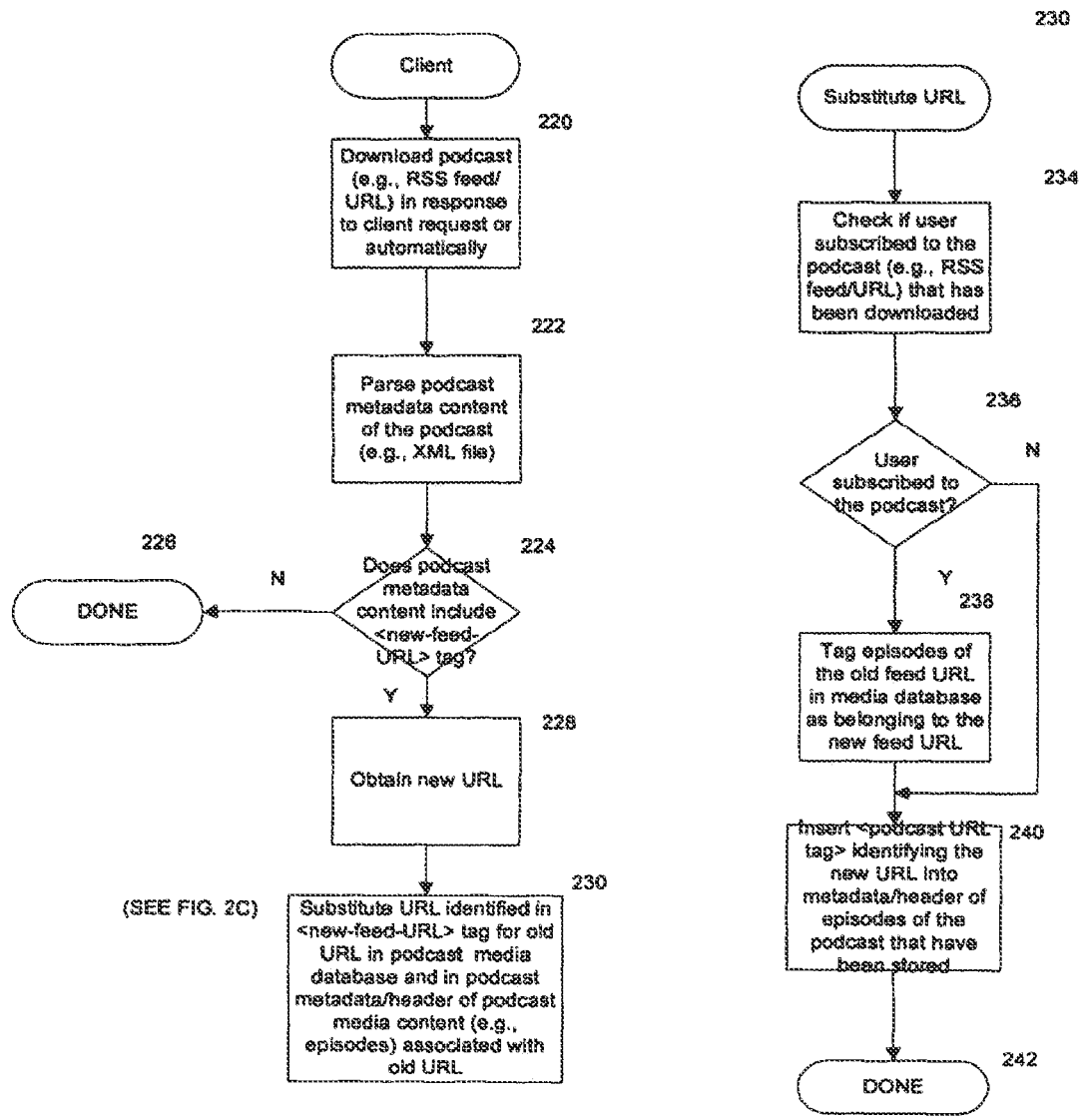

FIGS. 2A-2C are process flow diagrams illustrating methods of processing a new-feed-URL tag to re-locate an RSS feed in accordance with one embodiment of the invention. When a server such as that associated with an online media store receives a podcast, the podcast has associated therewith both metadata content and media content. The server parses the podcast metadata content to identify each new-feed-URL tag, if any, and stores information associated with the podcast for subsequent use by the server. For example, a new URL associated with each new-feed-URL tag can be identified and stored.

As shown in FIG. 2A, when a podcast is received by the server at 202, the podcast metadata content is parsed at 204. The server then determines whether the podcast metadata content includes a new-feed-URL tag at 206. If the podcast metadata content does not include at least one new-feed-URL tag, the process ends at 208.

When a new-feed-URL tag is detected, a new URL associated with the new-feed-URL tag is obtained from the podcast metadata content at 210. The new URL is then substituted for the old URL previously associated with the podcast or episode(s) at 212. The podcast media content may include one or more episodes, and therefore it may be desirable to tag the podcast as a whole or tag each episode of the podcast as belonging to the new URL where the tag is associated with the entire feed.

For those episodes that the server is hosting (and therefore storing), the server may update metadata of each of the episodes (e.g., in a header) at 214. This may be accomplished, for example, by inserting information (e.g., a podcast-URL tag) identifying the new URL into the header portion of the media content file for the episode. Using this information, the episode can include all metadata pertinent to it, thereby enabling that metadata to be retrieved should the episode be copied to a client device.

A client device receiving an episode that has been modified in this manner may perform a similar process to identify the new URL and any associated tag in the associated metadata. The client device may then store the episode (e.g., media file) and the associated metadata (e.g., new URL) in a database.

The client device may also perform a process similar to the server (e.g., where the content is not hosted by the media store). A podcast may be downloaded automatically (e.g., periodically upon subscription to the podcast) or in response to a client request. As shown in FIG. 2B, when a podcast is downloaded at 220, the client device parses the podcast metadata content at 222. The client device determines whether the podcast metadata content includes a new-feed-URL tag at 224. If the podcast metadata content does not include a new-feed-URL tag, the process ends at 226.

If the podcast metadata content does include a new-feed-URL tag, the new URL is obtained at 228. Once the new URL is obtained, the new URL is substituted for the old URL in the table, database or other data structure maintained by the client device, and may also be substituted (or inserted) in the metadata (e.g., header) of the corresponding podcast media content (e.g., episode(s)) at 230. One method of performing this substitution will be described in further detail below with reference to FIG. 2C.

The client may or may not have subscribed to a particular podcast, even though an episode of the podcast has been stored. For example, the client may have simply downloaded a single episode of the podcast. As another example, the client may choose to unsubscribe to a podcast he or she has previously subscribed to.

As shown in FIG. 2C, in accordance with one embodiment, the client device determines if the user has subscribed to the podcast that has been downloaded at 234. For instance, the client device may determine whether the user has subscribed to a podcast having the same title as that associated with the new-feed-URL tag. The client device may also check the URL associated with this subscription and compare the URL with the old URL associated with the new-feed-URL tag.

If the client device determines that the user has subscribed to the podcast at 236, the episode(s) of the podcast are tagged as belonging to the new URL in the client table or database maintained by the client at 238. In other words, episodes of the old feed are tagged as belonging to the new feed. If the client device determines that the user has not subscribed to the podcast at 236, step 238 may be skipped and the process continues at 240.

In accordance with one embodiment, when a podcast has been downloaded, the podcast media content is marked to associate the content with the new URL. As set forth above, this may be accomplished by inserting information (e.g., a podcast URL tag) identifying the new URL into a header of each file for the episode of the podcast that has been stored at 242. Once an episode is "marked" in this manner as belonging to the new URL, the associated episode file may be copied or moved to another client device while enabling the client device to identify the new URL.

In accordance with one embodiment, when a podcast is downloaded, the user may choose to subscribe to the podcast. A user may choose to download a particular episode, for example, by simply dragging and dropping the episode from one client device to another client device. The user may then be presented with the title of the podcast and an option to subscribe to the podcast. The subscribe option that is displayed may be provided in the form of a "subscribe button" or other suitable format. When the user selects the subscribe option, the user is subscribed to the podcast such that the podcast is associated with the new URL. More particularly, the identity of the new URL may be obtained from the podcast URL tag. Upon subscribing to the podcast, at least a portion of the podcast media content of the podcast may be downloaded from its location at the new URL. More particularly, one or more episodes available at the new URL may be downloaded.

Another tag that facilitates the management of podcasts is the explicit tag (e.g., <explicit> tag). More particularly, in order to identify explicit content in an RSS feed, an explicit tag may be embedded in the RSS feed. An explicit tag may be used to indicate that a podcast includes explicit content, or that a particular episode of the podcast includes explicit content. Since an explicit tag can be embedded at the channel as well as the episode level, an RSS feed may include multiple explicit tags.

If the user has administrator access to his or her computer, they can use a parental control preference setting to restrict access to explicit content in the online media store. Users will not be able to preview or buy songs and other items in the media store that have been identified as having explicit content when the parental control is set. Additional information on parental control is provided in U.S. patent application Ser. No. 11/221,351, filed Sep. 5, 2005, and entitled "PARENTAL CONTROL GRAPHICAL USER INTERFACE," which is hereby incorporated herein by reference.

Figure 3:
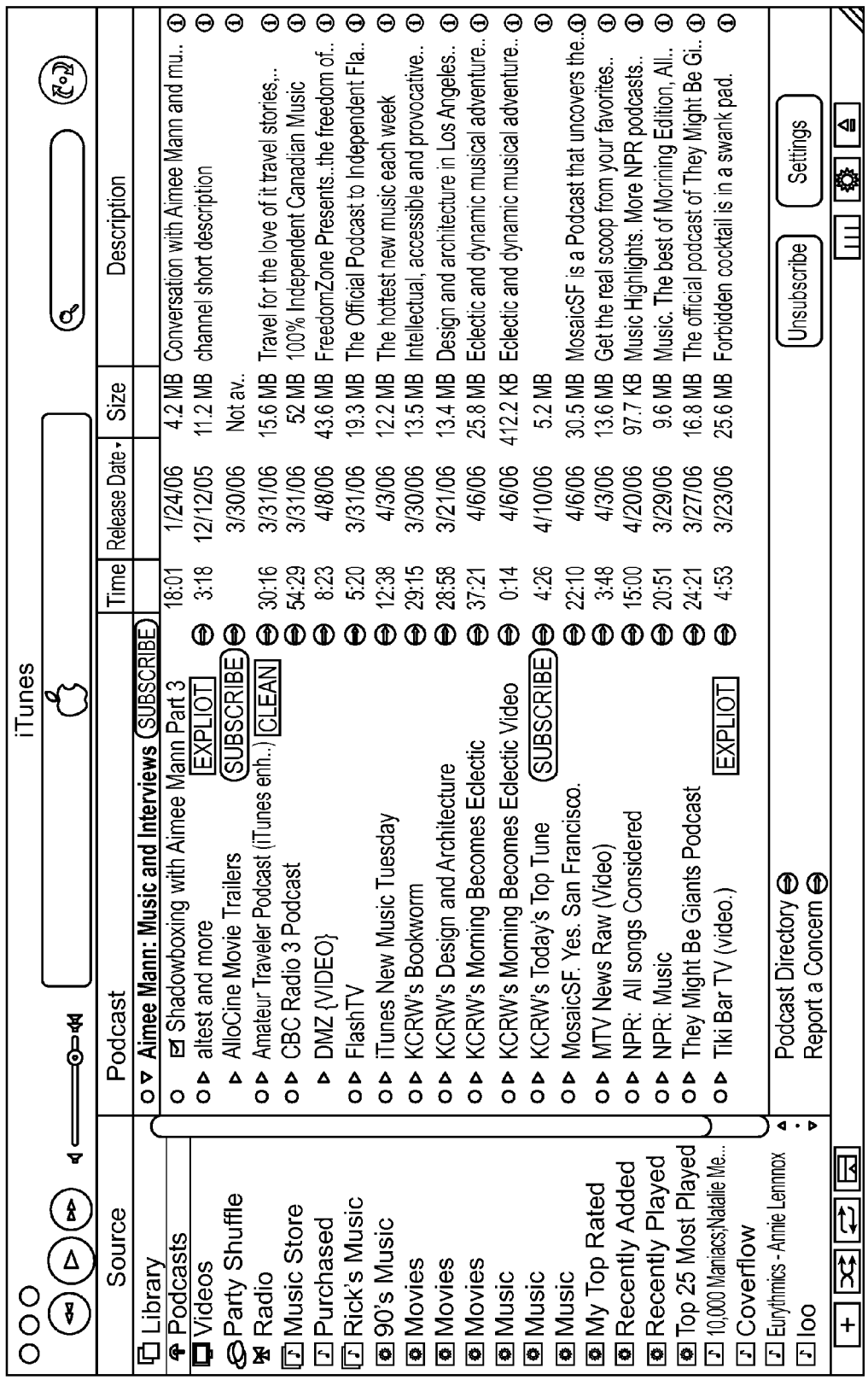
FIG. 3 is an exemplary screen shot illustrating the presentation of explicit indicators indicating that a podcast or episode contains explicit content.

It may be desirable to determine from the presence of one or more explicit tags whether a podcast or episode includes explicit content in order to provide this information to a potential purchaser. FIG. 3 is a screen shot illustrating the presentation of explicit indicators indicating that a podcast or episode contains explicit content in accordance with one embodiment. As shown in FIG. 3, it may be desirable to provide a visual indicator indicating whether a podcast or episode includes explicit content. Note in FIG. 3 when podcast information is being displayed, an "Explicit" indicator can be shown proximate to those podcasts or individual episodes thereof that contain explicit content.

It may also be desirable to store information indicating whether the podcast or episode(s) of the podcast includes explicit content based upon information obtained from the explicit tag(s) present in an RSS feed. In accordance with one embodiment, when a podcast having both podcast metadata content and podcast media content is received, the podcast metadata content is parsed to ascertain whether the podcast media content includes explicit content. Information associated with the podcast corresponding to the parsed metadata content (e.g., indicating whether the media content includes explicit content) may then be stored. This information may be stored at a client device, as well as a server associated with a web site (e.g. online media store). For example, this information may be used to determine whether a particular episode may be purchased by a user or whether a podcast may be subscribed to by a user in accordance with a filter such as a parental control that limits the content of information that may be accessed by or downloaded to a client device.

Figure 4A:
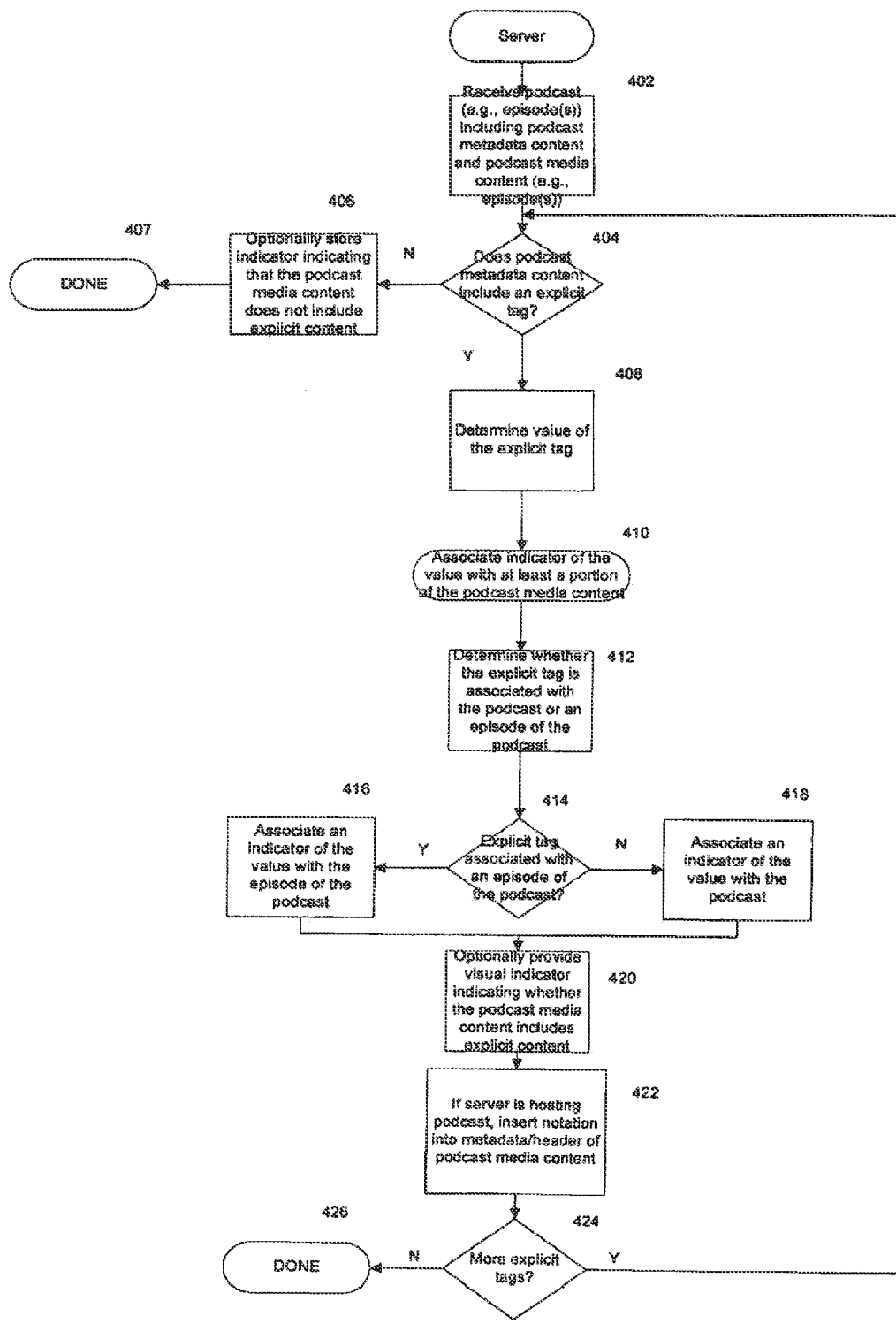
FIGS. 4A-4B are process flow diagrams illustrating methods of processing an explicit tag to identify explicit content in an RSS feed in accordance with one embodiment of the invention.
Figure 4B:
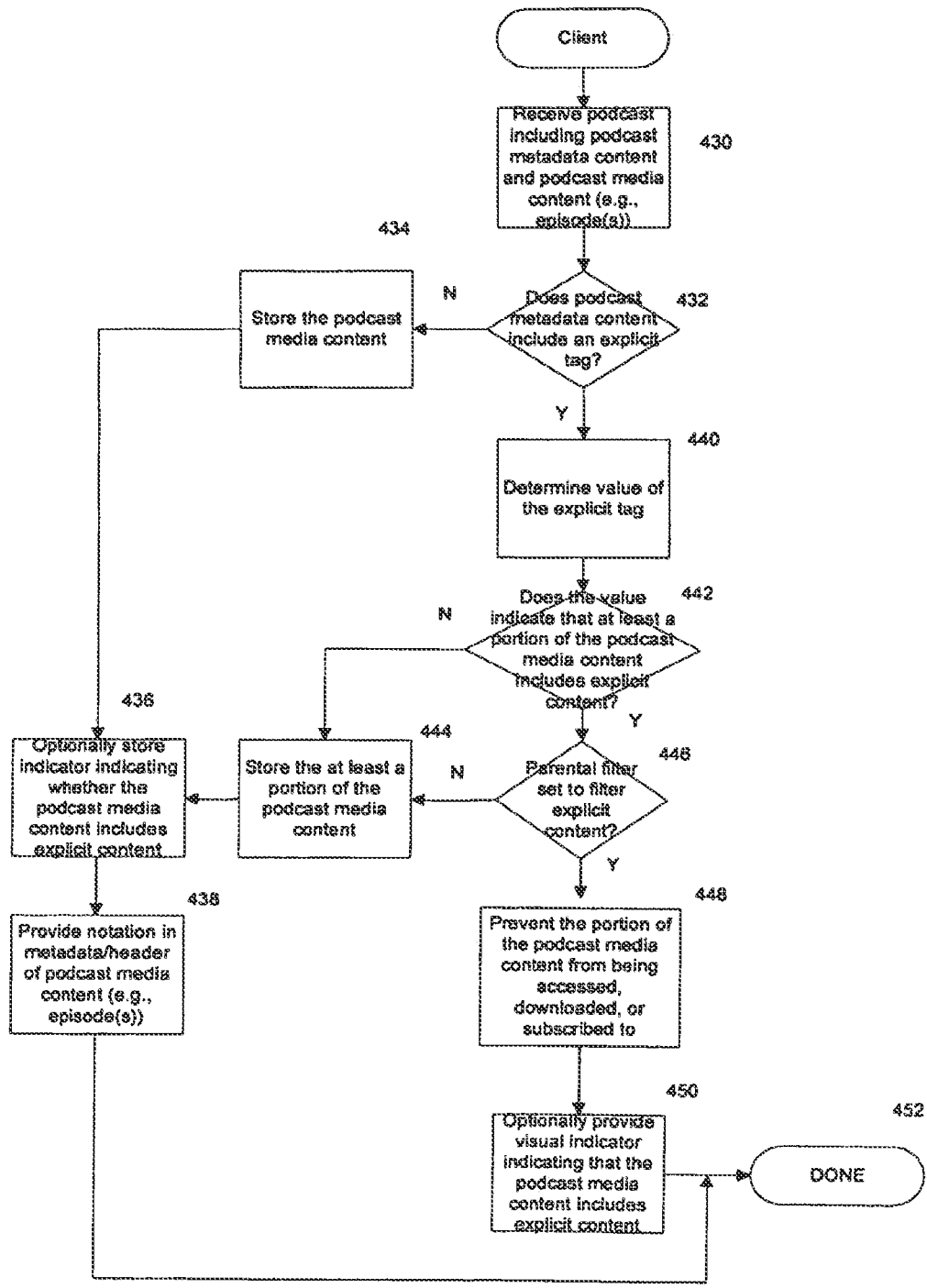

FIGS. 4A-4B are process flow diagrams illustrating methods of processing an explicit tag to identify explicit content in an RSS feed in accordance with one embodiment of the invention. When a server receives a podcast including podcast metadata content and podcast media content at 402, the server determines whether the podcast metadata content includes an explicit tag at 404. If it is determined that the podcast metadata content does not include any explicit tags, it is assumed to be unknown whether the podcast does not include explicit content. An indicator indicating that the podcast does not include explicit content may be stored at 406 and the process ends at 407.

If it is determined that the podcast does include an explicit tag, the value of the explicit tag is determined at 408. As one example, the value of the tag can indicate that the content is explicit or clean (or not specified). As another example, the value of the tag could correlate to a rating scheme of some sort. As set forth above, the explicit tag may be associated with the podcast or an episode of the podcast. Therefore, in order to associate an indicator of the value of the explicit tag with the corresponding podcast media content as shown at 410, it is determined whether the tag is associated with the podcast or merely an episode of the podcast at 412. If the tag is associated with an episode of the podcast at 414, an indicator of the value of the tag is associated with the episode of the podcast at 416. However, if the tag is associated with the entire podcast at 414, an indicator of the value of the tag is associated with the podcast at 418. The indicator may be associated with the podcast (e.g., all episodes of the podcast) or an episode of the podcast via a table or other suitable data structure.

In addition, a visual indicator of the value of the explicit tag may be provided at 420. For instance, as shown in FIG. 3, the word "explicit" may be provided to indicate explicit content. A customer of the media store may see the work "explicit" being displayed proximate to a podcast or an episode thereof when viewing podcasts for purchase.

If the server is hosting the podcast, the server stores the podcast media content as well as the podcast metadata content. In accordance with one embodiment, information corresponding to explicitness of the podcast media content can be inserted into the header portion of the corresponding episode file(s) at 422. Therefore, when a client device that has downloaded an episode, subsequently copies the episode to another client device, the new device may ascertain from this explicitness information whether the episode(s) include explicit content. The process continues for any remaining explicit tags at 424. Once all explicit tags have been processed, the process ends at 426.

A client device receiving an episode that has been modified in this manner may perform a similar process to identify explicitness information in the episode file. The client device may then store the episode (e.g., media file) and the associated explicit status (as well as other metadata) in a database.

A client device may handle explicit tags similarly to the server (e.g., when the feeds are not hosted by the server). As shown in FIG. 4B, when the client receives a podcast at 430, the client determines whether the podcast metadata content includes an explicit tag at 432. If the podcast metadata content does not include an explicit tag, it is presumed that it is not known whether the podcast media content does not include explicit content and the podcast media content may be downloaded at 434, regardless of whether a parental control or other filter is implemented.

Once podcast media content (e.g., one or more episodes) has been downloaded, it may be desirable to later ascertain whether this content includes explicit content. For instance, a client device may download all podcast media content, regardless of whether it includes explicit content. However, the client device may later choose to implement a content filter to restrict download of explicit content. Therefore, it may be desirable to store an indication of whether the podcast media content includes explicit content at 436.

Even though the client device may not itself need to discern whether the podcast media content includes explicit content, the client device may attempt to copy an episode to another client device that does implement a content filter. Therefore, it may be desirable if the second client device could ascertain whether the podcast media content includes explicit content. This may be accomplished by inserting information into the metadata (e.g., header) of the podcast media content (e.g., the corresponding episode(s) of the podcast) at 438 to indicate whether the corresponding episode(s) includes explicit content. For instance, this insertion process may be performed for all episodes, or only those episodes that include explicit content.

If the podcast metadata content does include an explicit tag at 432, the client determines the value of the explicit tag at 440. For instance, the value of the explicit tag may indicate that the corresponding content is explicit when in a first state and may indicate that the corresponding content is not explicit when in a second state. In accordance with one embodiment, the value may be "clean" or "explicit."

If the value of the explicit tag indicates that at least a portion of the podcast media content does not include explicit content at 442, the corresponding podcast media content may be stored at 444 (regardless of whether a content filter is in use). Steps 436 and 438 may then be performed to store an indication of the explicitness of the content external to the podcast media content and/or provide such an indication in the metadata of the corresponding podcast media content (e.g., episode(s)).

However, if the value of the explicit tag indicates that at least a portion of the podcast media content does include explicit content at 442, a determination is made as to whether a content filter such as a parental filter is set to filter explicit content. If the content filter is not set to filter explicit content at 446, steps 444, 436 and 438 may be performed as set forth above.

If the content filter is set to filter explicit content at 446, the corresponding podcast media content (e.g., a single episode or all episodes of the podcast) is prevented from being accessed, downloaded, and/or subscribed to at 448. While it is possible to store an indicator indicating that the podcast media content includes explicit content as indicated at 436, this is unnecessary since the podcast media content is not downloaded. However, it may be desirable to provide a visual indicator at 450 explaining that the corresponding podcast media content includes explicit content and cannot be downloaded. The process ends at 452.

In accordance with another embodiment, the client device may ask the server whether the requested podcast media content includes explicit content or request that the podcast media content be downloaded. If the podcast media content does include explicit content, the server may provide this information to the client device without providing the podcast media content. However, if the podcast media content does not include explicit content, the server may provide the podcast media content along with an optional indication that the podcast media content does not include explicit content. In either case, the client device may store an indication as to whether the podcast media content includes explicit content.

As set forth above, an explicit tag may be provided at the channel level, as well as the episode level. Therefore, it is possible that an explicit tag is present at both the feed and episode levels. Where the value of the explicit tag at the feed level contradicts the value of the explicit tag at the episode level, the value of the tag at either the feed or episode level controls, depending upon the configuration of the system.

Another tag that facilitates the management of podcasts is the duration tag (e.g., <duration> tag). In order to obtain an estimate of the duration of an RSS feed or episode, a duration tag may be embedded in the RSS feed. Since a duration tag may be used to provide an estimated duration of a particular episode of a podcast, an RSS feed may include multiple duration tags.

In accordance with one embodiment, when a podcast having podcast metadata content and podcast media content is received, the podcast metadata content can be parsed to ascertain an approximate duration of at least a portion of the podcast media content. Information associated with the podcast corresponding to the parsed podcast metadata content is then stored such that the approximate duration of the portion of the podcast media content is associated with the corresponding podcast media content (e.g., episode).

Figure 5A:
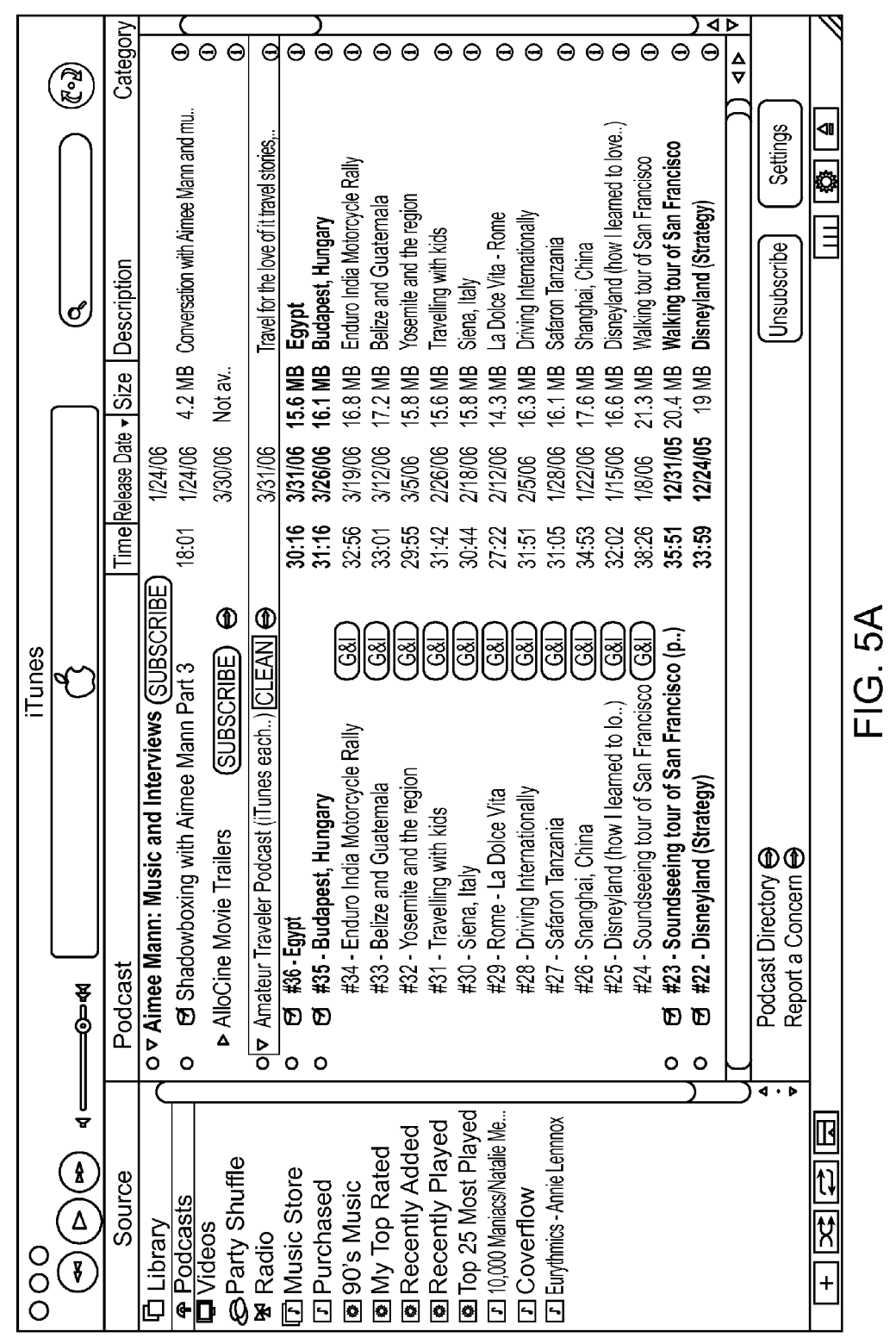

FIG. 5A is an exemplary screen shot illustrating the presentation of a duration associated with a podcast episode. The duration may be an actual duration or an estimated duration. In accordance with one embodiment, the duration is an estimated duration obtained from a duration tag. For example, episode #30 of the Amateur travel Podcast is displayed in FIG. 5A with a time duration of 30:44, meaning 30 minutes and 44 seconds. Given that this episode's media content has not been downloaded to the client device, the time duration being displayed is that acquired from the RSS feed, namely, from a duration tag within the RSS feed file that provides an estimated duration. The duration may then be replaced with an actual duration once the episode is downloaded.

Figure 5B:
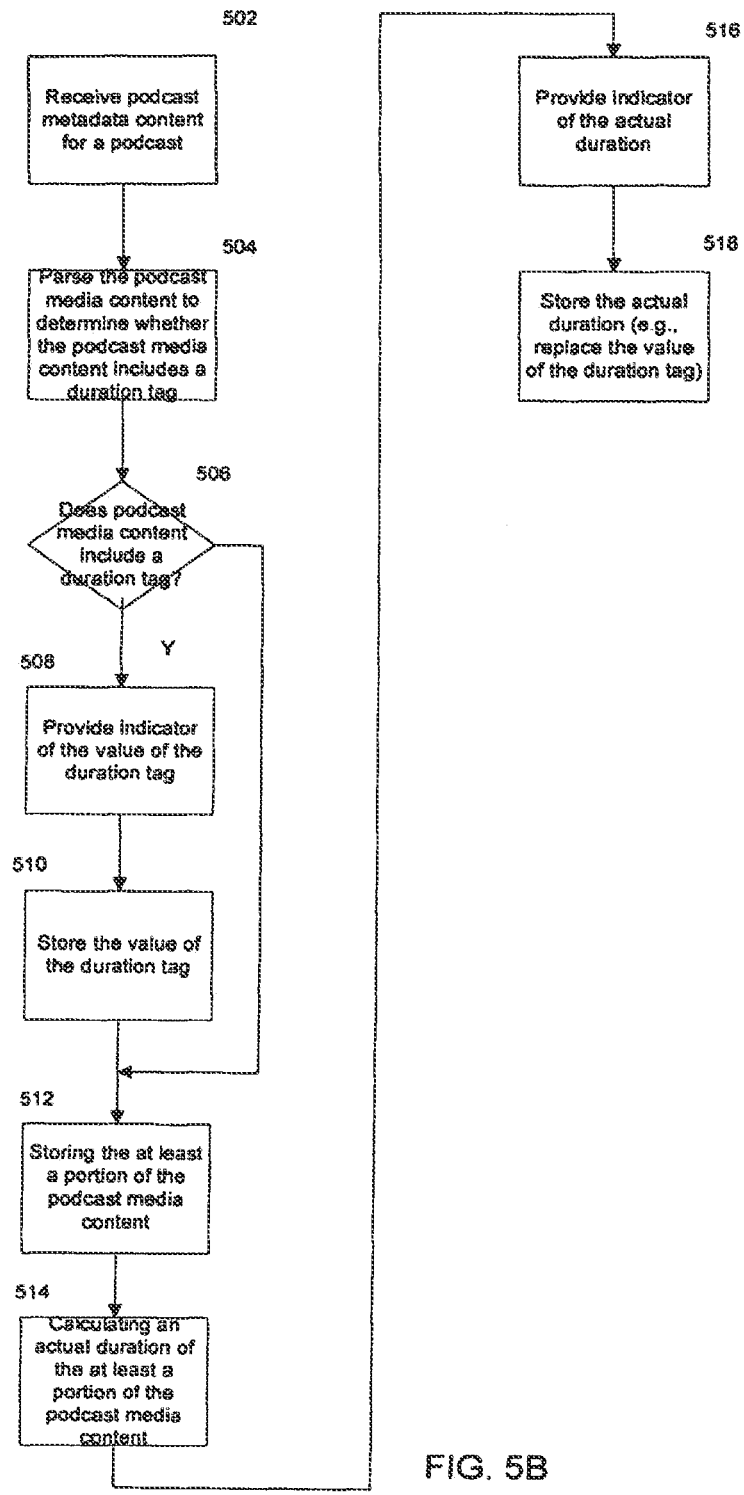
FIG. 5B is a process flow diagram illustrating a method of obtaining a duration associated with a podcast episode in accordance with one embodiment of the invention.

FIG. 5B is a process flow diagram illustrating a method of obtaining a duration associated with a podcast episode in accordance with one embodiment of the invention. As shown at 502, podcast metadata content for an episode of a podcast is received. For example, the podcast metadata content for a podcast may be displayed at a client device. The podcast metadata content is then parsed at 504 to determine whether the podcast metadata content includes a duration tag. If the podcast metadata content includes a duration tag at 506, a visual indicator of the value of the duration tag may be provided at 508. For example, the value is typically an estimated duration for an episode. The value of the duration tag may be stored at 510.

When the portion of the podcast media content is downloaded (e.g., upon request by a user) at 512, at least a portion of the podcast media content is stored. On or following download, the actual duration of the corresponding podcast media content may calculated at 514 via various known techniques. The actual duration may then be provided (e.g., via a visual indicator) at 516 as well as stored at 518. For instance, the actual duration may replace the value of the duration tag (i.e., estimated duration) that is displayed and/or stored. In addition, the actual duration may be embedded in the header portion of the corresponding episode file. In this manner, the actual duration of an episode of a podcast can be associated with its electronic file.

The duration processing illustrated in FIG. 5B can be performed on a client device or a server device. A client device receiving an episode that has been modified to include one or more duration tags may perform a similar process to identify the actual duration and any associated tag in the metadata of the episode. The client device may then store the episode (e.g., media file) and the associated metadata (e.g., actual duration) in a database.

The approximate and actual durations may be expressed, for example, in hours, minutes, and/or seconds. For instance, the duration tag can be formatted HH:MM:SS, H:MM:SS, MM:SS, or M;SS, where H denotes hours. M denotes minutes, and S denotes seconds. In accordance with one embodiment, if one colon is present, the number to the left of the colon is assumed to be in minutes, and the number to the right of the colon is assumed to be in seconds.

It may be desirable for a variety of reasons to remove or block a particular feed or episode from appearing in an online media store or portion thereof. In accordance with one embodiment, a block tag (e.g., <block> tag) may be used to facilitate the management of podcasts by enabling an owner of a feed to block a particular feed or episode. This may be accomplished by embedding a block tag in the RSS feed. Since a block tag may be implemented at the feed and/or episode levels, an RSS feed may include multiple block tags.

In accordance with one embodiment, an RSS feed or episode may be blocked by removing the RSS feed or episode from the online media store. Removing an RSS feed or episode from the online media store may be accomplished by removing the corresponding URL from the online media store. If the RSS feed is hosted by a server associated with the online media store, removal of the feed or episode(s) may include deleting the actual episode(s) from the server. Alternatively, the RSS feed or episode may be blocked by "marking" it as blocked. For instance, the blocked status of RSS feeds may be maintained in a data structure such as a table or database. An exemplary table that may be used for this purpose will be described in further detail below with reference to FIG. 8.

Figure 6:
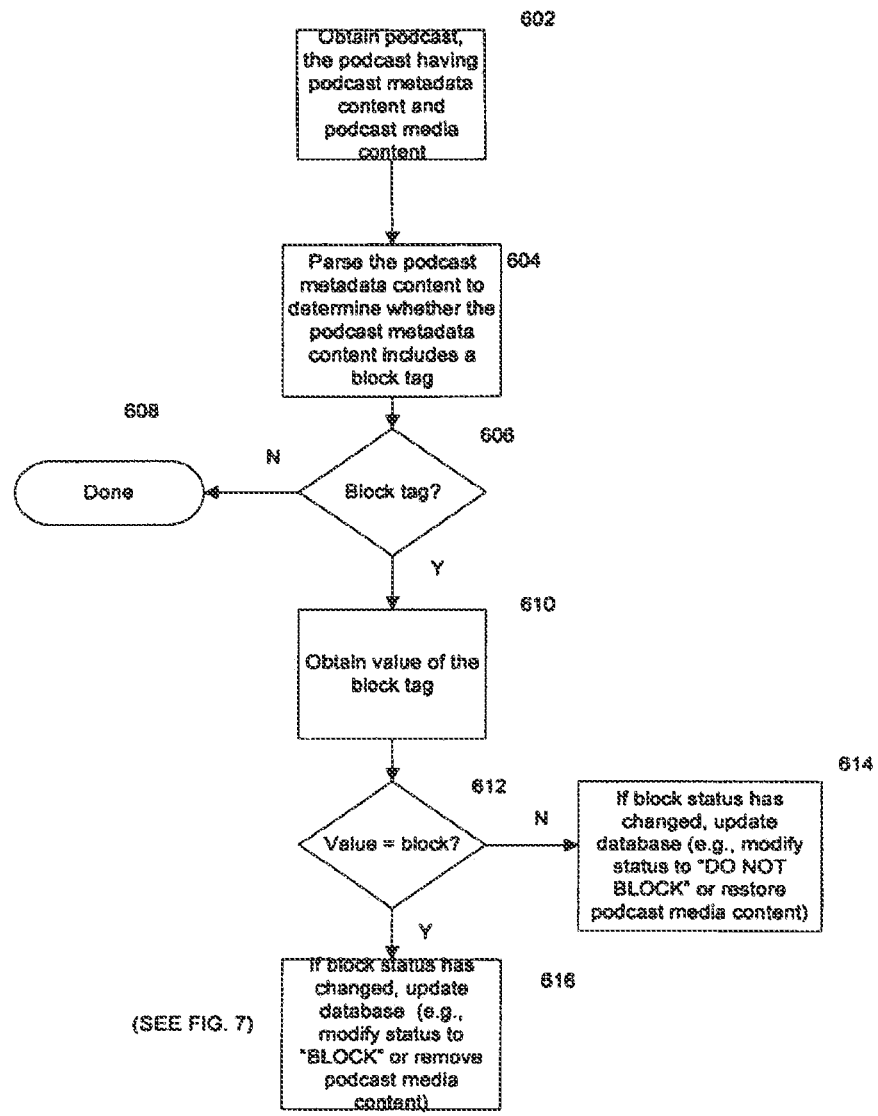
FIG. 6 is a process flow diagram illustrating a method of processing a block tag to block access to a feed or episode in accordance with one embodiment of the invention.

FIG. 6 is a process flow diagram illustrating a method of processing a block tag to block access to a feed or episode in accordance with one embodiment of the invention. As shown at 602, when a podcast having podcast metadata content and podcast media content is received, the podcast metadata content is parsed at 604 to determine whether the podcast metadata content includes a block tag. If the podcast metadata content does not include a block tag 606, the process ends at 608. Thus, the block status of the corresponding podcast media content remains unchanged. Alternatively, the absence of a block tag may signify that the content is not to be blocked by the media store.

If the podcast metadata content does include a block tag at 606, the value of the block tag is obtained at 610. In accordance with one embodiment, the value of the block tag may indicate that the corresponding podcast media content is to be blocked when the block tag is in a first state (e.g., "Yes"), while the value of the block tag may indicate that the corresponding podcast media content is to be unblocked when the block tag is in a second state (e.g., "No").

If the value of the block tag is "No" 612, the corresponding podcast media content may be restored and/or marked to indicate that the podcast media content is not to be blocked as shown at 614. However, it is important to note that the restoring of the corresponding podcast media content and/or marking the status of the podcast media content to indicate that the podcast media content is not to be blocked need only be performed if the block status has changed. Restoring of the podcast media content may include storing at least one URL associated with the podcast media content. If the server associated with the online media store is hosting the podcast media content, restoring the podcast media content may include storing the actual episode(s).

If the value of the block tag is "Yes" 612, the corresponding podcast media content is blocked by removing the podcast media content and/or marking the podcast media content to indicate that the podcast media content is to be blocked as shown at 616. However, it is important to note that the removing of the corresponding podcast media content and/or marking the status of the podcast media content to indicate that the podcast media content is to be blocked need only be performed if the block status has changed. Podcast media content may be removed from a media store by removing at least one URL from the online media store and/or deleting the actual episode(s) (e.g. if the media store server is hosting the podcast). This process may be repeated for all other remaining block tags in the podcast metadata content at 604.

Figure 7:
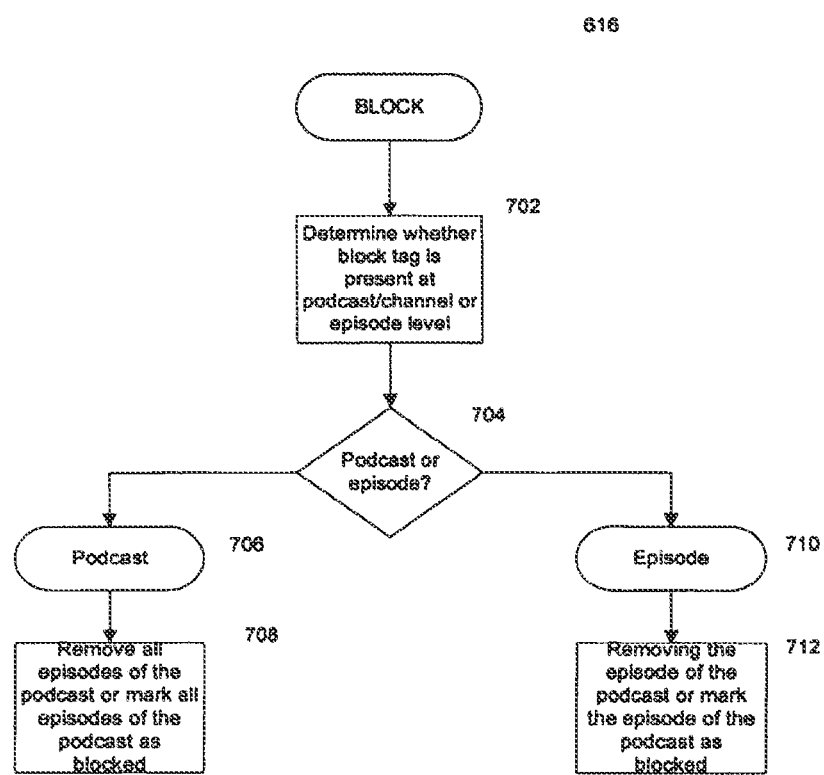
FIG. 7 is a process flow diagram illustrating a method of blocking access to a feed or episode as shown in FIG. 6.

One method of blocking access to a podcast or episode is described with reference to FIG. 7. As shown at 702, it is determined whether the block tag that has been detected is present at the podcast or the episode level at 704. If the block tag is present at the podcast (i.e., channel or feed) level at 706, all of the episodes of the podcast are removed and/or marked as being blocked at 708. Alternatively, if the block tag is present at the episode level at 710, the corresponding episode is removed and/or marked as being blocked at 712. Episode(s) may be removed by deleting the episode(s) (e.g., if the media store server is hosting the podcast) and/or removed by deleting at least one URL associated with the episode(s) from the online media store. A similar process may be performed to "unblock" access to a podcast or episode.

FIG. 8 is an exemplary table that may be used to identify those podcasts that have been blocked. In this example, a title 802 of a feed or episode is provided, along with a corresponding URL 804 and a block status 806. The block status 806 indicates whether the feed or episode is to be blocked by an online media store. In order to block or unblock a particular feed or episode, the block status 806 may simply be changed to "Y" or "N," respectively. Alternatively, to block a feed or episode an entry including the URL 804 may be deleted.

It is possible that a block tag may be provided at the channel level (feed level) as well as the episode level. Therefore, it is possible that a block tag is present at both the feed and episode levels. Where the value of the block tag at the feed level contradicts the value of the block tag at the episode level, the value of the tag at either the podcast or episode level governs, depending upon the configuration of the system.

Another way that a user may remove or block a feed or episode from the media store is to contact the media store via email or other user interface. In accordance with one embodiment, a user may report a concern regarding a particular podcast or episode.

In accordance with one embodiment, in order to submit a claim of ownership to remove or block a feed, an owner of a podcast may interact with a client device to find and select the podcast. The user may then click on "Report a Concern" control (e.g., hyperlink or button).

Figure 9:
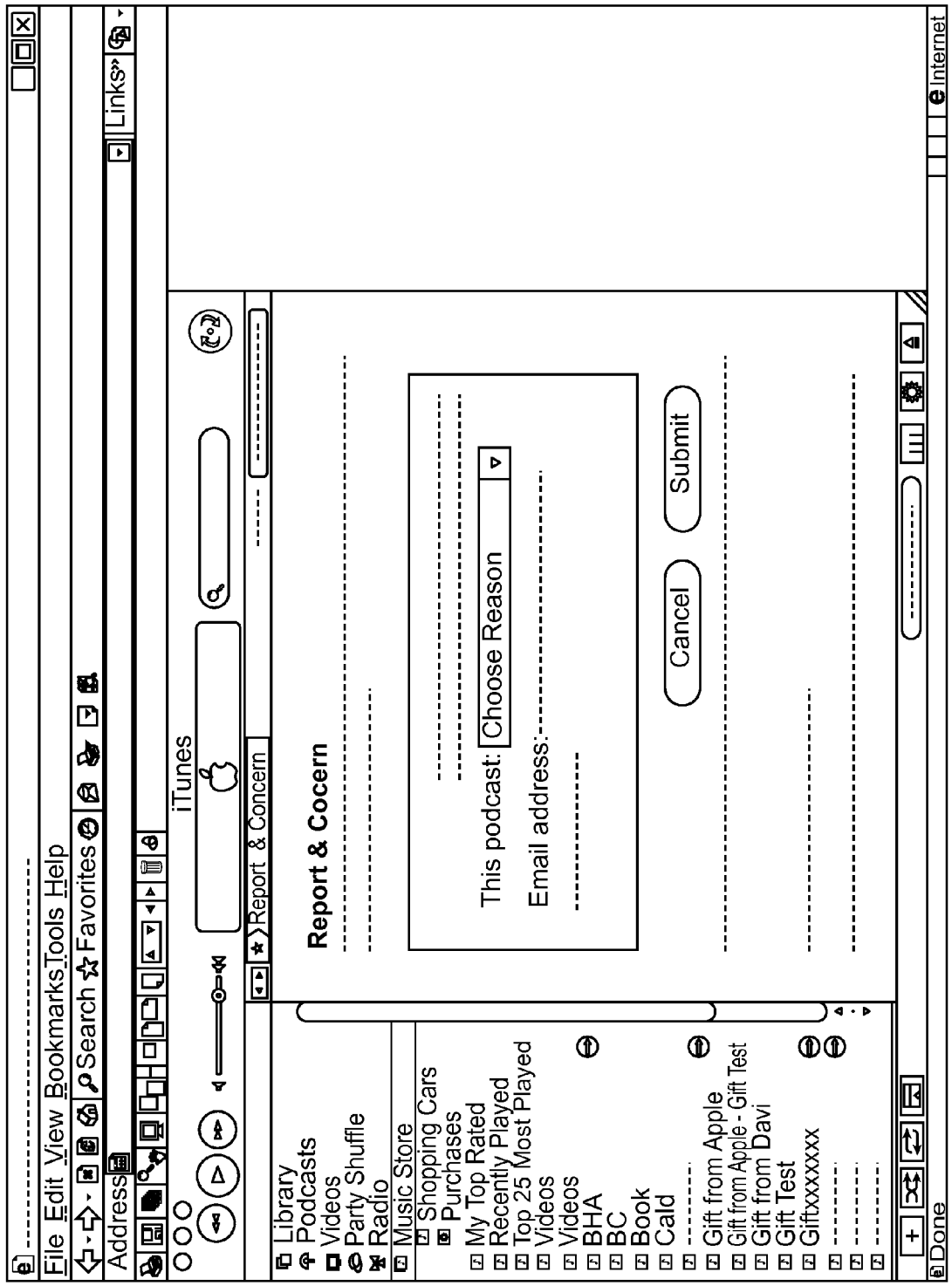
FIG. 9 is an exemplary graphical user interface enabling a user to report a concern.

FIG. 9 is an exemplary graphical user interface enabling a user to report a concern. In the report, the user identifies a particular podcast via its title and/or URL. In addition, the user provides his or her contact information. The contact information may include a name, an email address, a phone number, and/or other suitable information. The user may then set forth his or her concern regarding the podcast or episode (s) thereof.

A user may set forth a variety of concerns. Such concerns may include the functionality (or lack thereof) of a particular podcast or episode. Other concerns may include a claim of ownership of a podcast. In this case, it may be desirable to permanently or temporarily block or remove the feed. Thus, the user may set forth a desired action (e.g., temporary or permanent removal or blocking of the feed). In accordance with one embodiment, the user may select a predetermined concern, such as "This is mine and I want it removed from the Media Store," from a "Choose a Reason" menu. The user could also explain why they want the podcast removed or why the requested action is appropriate.

When an owner of a podcast has a concern regarding another person publishing a podcast that they own, they can submit a claim of ownership of the podcast via the report a concern" page. In other words, the owner may "challenge" the ownership of the podcast. When the challenger submits a claim of ownership, the system (e.g., online media store) sends a code to the challenger. The code may be generated in a variety of mechanisms, such as the generation of a random number via a random number generator. The challenger is then to include this code at the location (e.g., URL) of the podcast. For instance, the challenger may be directed to include the code in the podcast metadata content (e.g., XML), or in a specified, named file available (or to be made available) at the URL of the podcast. The challenger may be given a particular period of time to submit this "proof" of ownership.

The system subsequently verifies that the code exists at the requested location. As set forth above, the system may verify that the code exists in the podcast metadata content of the podcast or in the requested file at the URL of the podcast. When the system verifies that the code does exist at the requested location, the challenger is associated with the podcast. In addition, the association between the challenged submitter of the podcast and the podcast is removed. Access to the podcast may then be permitted or blocked/removed as requested by the challenger. For instance, such access or lack thereof may be provided via an online media store via an associated server.

Figure 10:
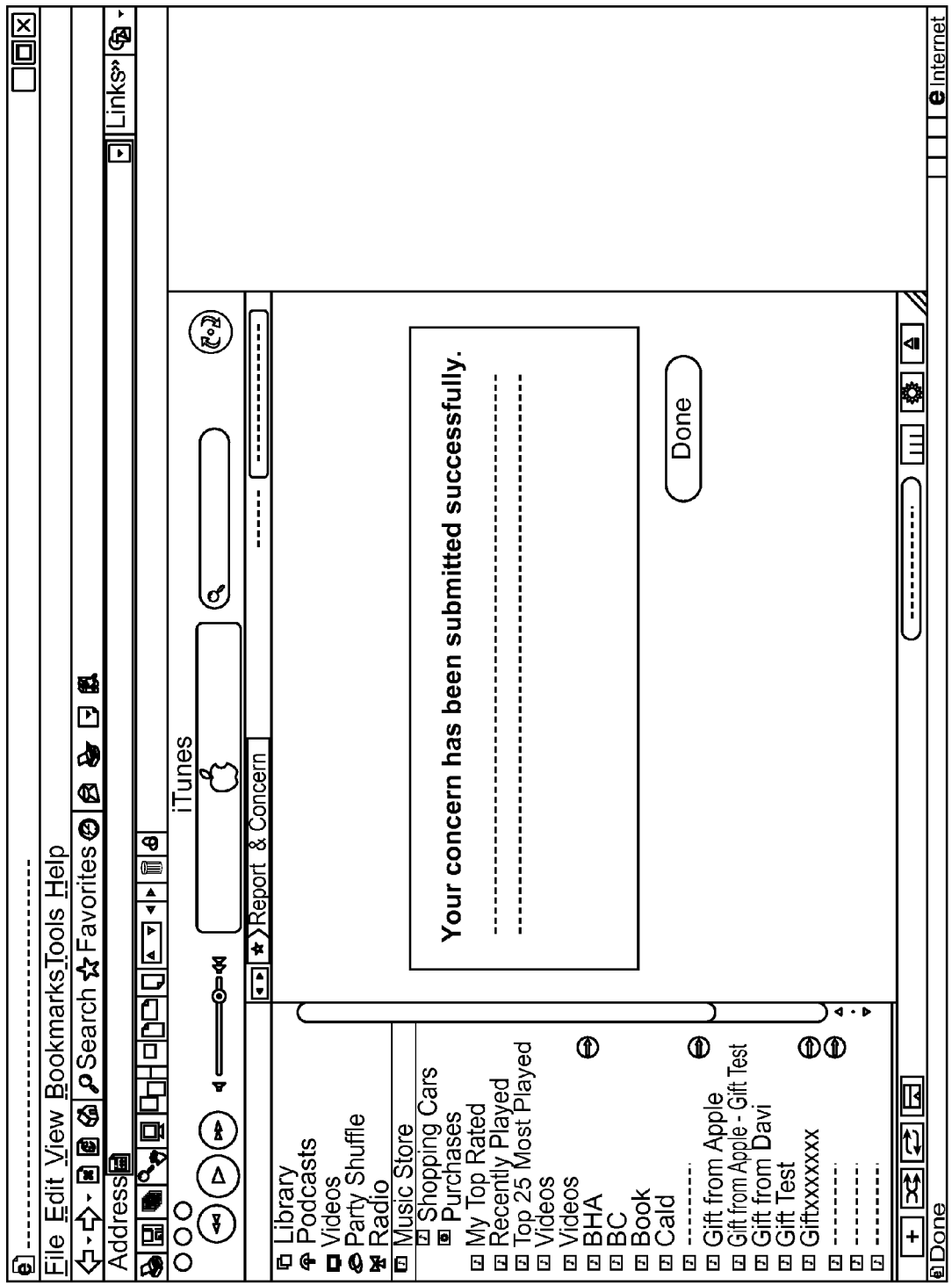
FIG. 10 is an exemplary screen shot that may be displayed to confirm receipt of a report submitted by a user.

FIG. 10 is an exemplary screen shot that may be displayed to confirm receipt of a concern submitted by a user. This screen shot confirms that the concern has been submitted successfully. Alternatively, any problems with the reported concern received may be identified. For instance, if the title or URL cannot be matched in the media store database, an appropriate message may be provided. Subsequent communications regarding the identified concern or problem may be communicated via the user's contact information.

A user or podcast owner may also find that a feed (i.e., podcast) is unnecessarily included more than once at a media store. In order to prevent the same feed from being included twice, it is possible to implement duplicate detection. Duplicate detection may be accomplished, for example, by determining whether both entries or potential entries in the media store include the same network address (e.g., URL). Thus, even if the titles differ, duplicate podcast store entries may be detected. In accordance with one embodiment, if both the URL and title are the same, duplicate detection prevents the same feed from being included more than once in the media store index.

When errors or problems occur with feeds that have been submitted, the submitter and/or verified owner of the podcast may be notified. Such problems may include technical problems with a feed. For instance, technical problems may include the identification of duplicate entries. As another example, when a feed is parsed, illegal or unrecognized characters may be encountered. Other problems may include content-related issues. Content-related issues may include, for example, ownership or copyright issues. As these problems or errors are identified, they may be identified and recorded so that an appropriate message can be provided to the submitter and/or owner of the podcast. Notification may be accomplished via email or other suitable mechanism. As errors or problems are rectified, such correction may be stored. Alternatively, the record of the problems or errors may be deleted as they are rectified.

Under certain circumstances, it may be desirable to disqualify a feed. Disqualification may be accomplished, for example, by setting a variable or feed disqualification bit. Disqualification may indicate that the feed is under review and unavailable via the media store. More particularly, an entry for the feed in the media store may be removed. Notification of disqualification may be sent to the submitter and/or verified owner of the podcast via email or other suitable mechanism. For instance, the notification may indicate that the feed is disqualified or under review as well as identify the nature of the problem. As problems are corrected, the disqualification status may be updated to indicate that the feed is again available via the media store. Where technical problems require correction, the podcast owner may re-submit the feed once the problem(s) has been rectified. The corrected feed may then be made available via the media store (e.g., after completion of a review process).

Still further, a podcast owner can directly inform a podcast host or directory (e.g., media store) that some of the podcast data has changed. For example, a podcast owner can enter the network address (e.g., URL) for the podcast into a dialog window or other means and cause a notification to the podcast host or directory. Upon receiving the notification, the podcast host or directory can operate to update their data files and/or database by access the podcast at the network address. Hence, the podcast data at the host or directory is thus able to be promptly updated without delay. In one embodiment, to prevent excessive update requests, the podcast host or directory can limit the frequency of updates to a maximum number of updates per unit of time.

Other mechanisms for managing podcasts include those that enable podcasts to be transmitted in an efficient manner. In accordance with one embodiment, due to the large number of podcasts that are supported, an online media store typically does not host the podcasts. However, the retrieval and transmitted of images associated with a particular podcast can consume significant bandwidth.

One manner in which the transmission of images associated with a particular podcast can be facilitated is through storing (e.g., caching) the images associated with a particular podcast, even when the remaining podcast media content is not hosted. The images may be periodically updated, enabling the images to remain current and be quickly retrievable.

Figure 11:
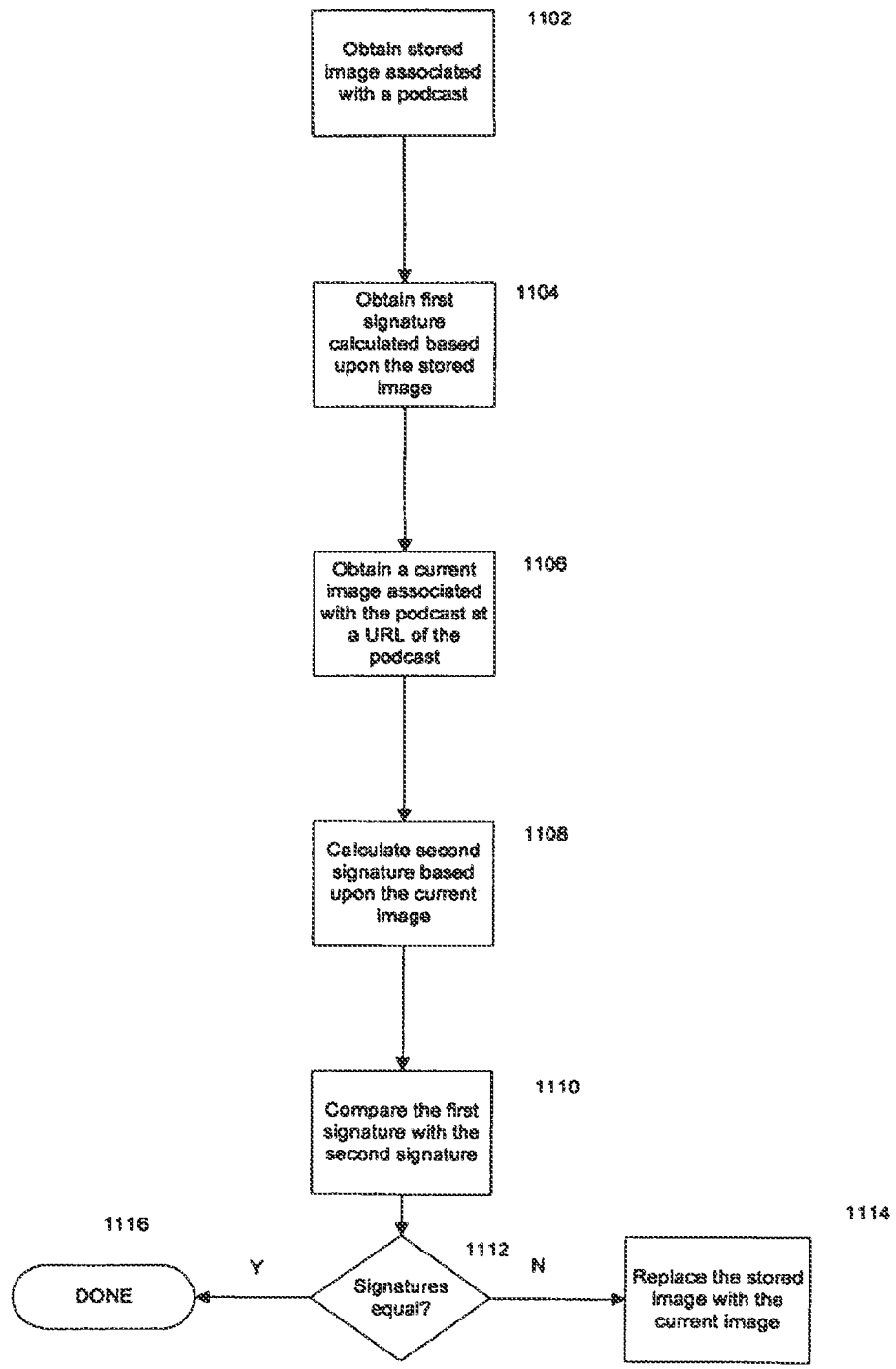
FIG. 11 is a process flow diagram illustrating a method of processing images associated with a podcast in accordance with one embodiment of the invention.

FIG. 11 is a process flow diagram illustrating a method of processing images associated with a podcast in accordance with one embodiment of the invention. Assuming that an initial image associated with a podcast (e.g., episode) has been stored, a stored image associated with the episode is obtained at 1102. A first signature calculated based upon the stored image is obtained at 1104. In order to avoid calculating the first signature each time the image is retrieved, the first signature may be stored along with the image. Thus, the first signature that has been calculated may be obtained along with the image, or may be calculated upon retrieval of the image.

In addition, a current image associated with the episode of the podcast is obtained at a URL of the podcast at 1106. The current image may be obtained periodically (e.g., daily or hourly) to enable the image data to be updated. A second signature is calculated based upon the current image at 1108, enabling the first signature to be compared to the second signature at 1110. If the signatures are not equal at 1112, the two images are not identical. In such case, the stored image is then replaced with the current image at 1114. However, if the signatures are equal at 1112, the image has not changed and therefore the stored image need not be replaced with the current image. The signatures that are calculated may include, for example, Cyclic Redundancy Check (CRC) values or hash numbers. The process ends at 1116.

In other embodiments, tags are embedded in the metadata of RSS feeds to facilitate the organization, browsing and/or searching of the RSS feeds. These tags include, for example, the category tag (e.g., <category> tag) and keyword tag (e.g., <keyword> tag). More particularly, through the use of one or more category tags, a podcast or episode may be categorized in an online media store according to one or more categories. Similarly, one or more keywords may be used to enable a podcast or episode to be easily located as a result of browsing and searching the online media store. Such categorization and searching may also be supported on a client device. FIGS. 12-16 illustrate the browsing and searching capabilities that may be supported by the use of the category and keyword tags.

Browsing or searching of media items available on a server (e.g., media store) can be performed much like searching for other types of media assets. For additional details on searching or browsing for media assets see U.S. patent application Ser. No. 10/832,984, filed Apr. 28, 2004, and entitled "GRAPHICAL USER INTERFACE FOR BROWSING, SEARCHING AND PRESENTING MEDIA ITEMS", which is incorporated herein by reference. However, as to browsing, to facilitate efficient browsing of podcasts, a graphical user interface having a hierarchy of lists can be displayed for a user. In one implementation, a first list of selectable items will be a list of genres. The user selects the genre denoted "Podcasts". Once the selection is made a second list of selectable items will be displayed. The selectable items in the second list are denoted "Categories". The categories are different categories that podcasts can be assigned to. Then, in response to a category selection, a third list of selectable items will be displayed. The selectable items in the third list are denoted "Subcategories" and represent available subcategories of the selected category, to the extent utilized. After the various selections have been made, those podcasts that match the selected category and selected subcategory (if used) are displayed in a media asset listing area.

An application program window can be displayed at a client device. The application program window can include a first sub-window and a second sub-window. The first sub-window includes a first region, a second region and a third region. The first region can display a list of available genre (genre list). After a user has selected one of the items within the genre list being displayed in the first region (namely, the podcast item), the second region can be populated with a list of podcast categories that are associated with the selected genre from the genre list. The list of podcast categories is provided by a remote server to the application program that presents the application program window. After the user has selected one of the available categories of the second region, the third region can be populated with a list of subcategories that are associated with the selected category. The subcategories within the third region, if any, are those pertaining to the selected category. When the list of subcategories has a plurality of items, the user would select one of the items, Once the user has selected one if the subcategories (or categories if no subcategories), the second sub-window can be populated with a list of available podcasts that are associated with the category and subcategory (if any). The list of available podcasts can display descriptive information for each of the podcasts. For example, the list of available podcasts can be presented in a row and column (e.g., table) format with each row pertaining to a different podcast, and with the columns pertaining to podcast name, artist/owner, duration, and price. Further, each of the rows can include a "Subscribe" button that allows a user to easily subscribe to the particular one of the podcasts in the list of available podcasts being displayed.

Figure 12:
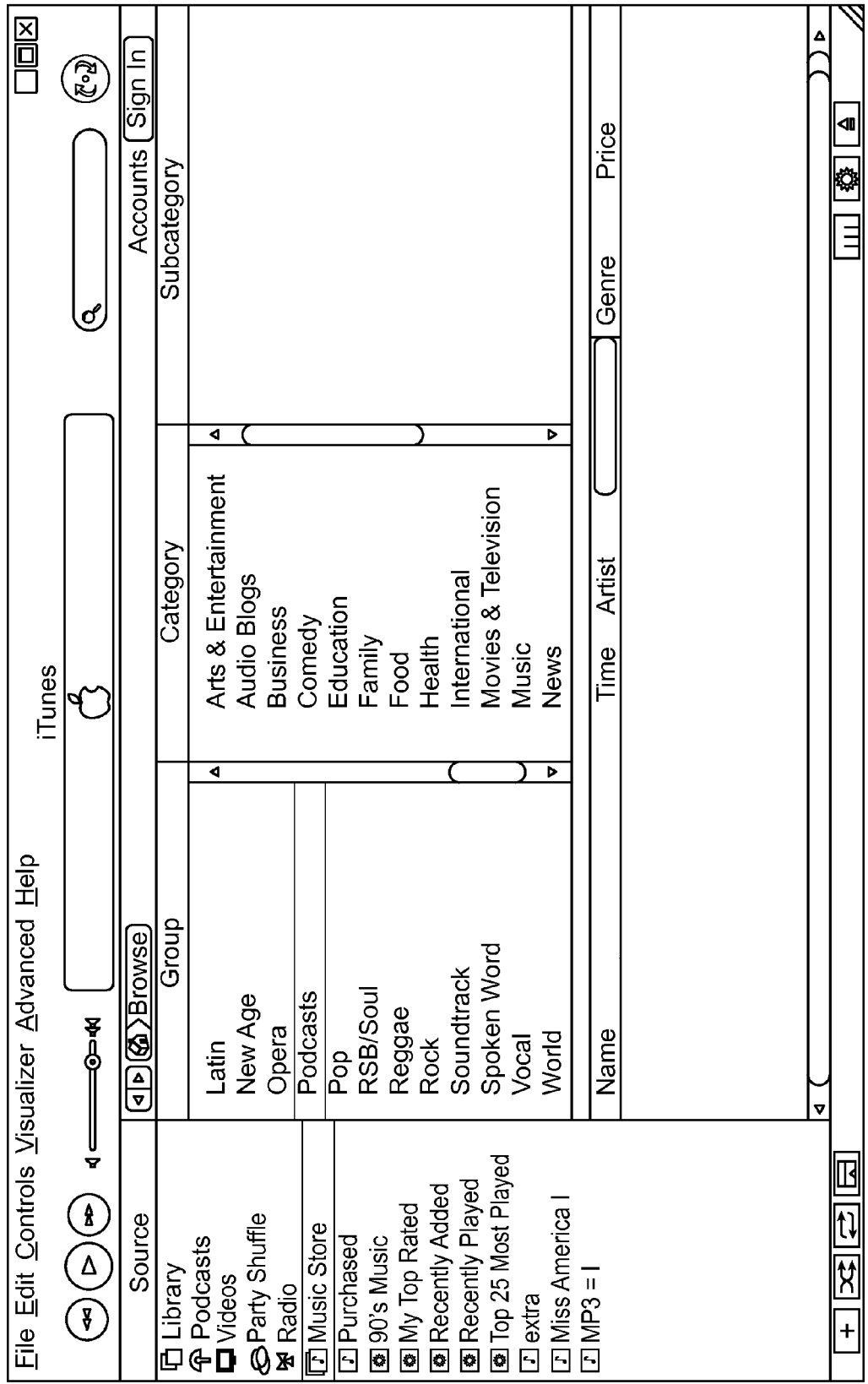
FIG. 12 is an exemplary graphical user interface that may be presented to enable a user to browse an online media store.
Figure 13:
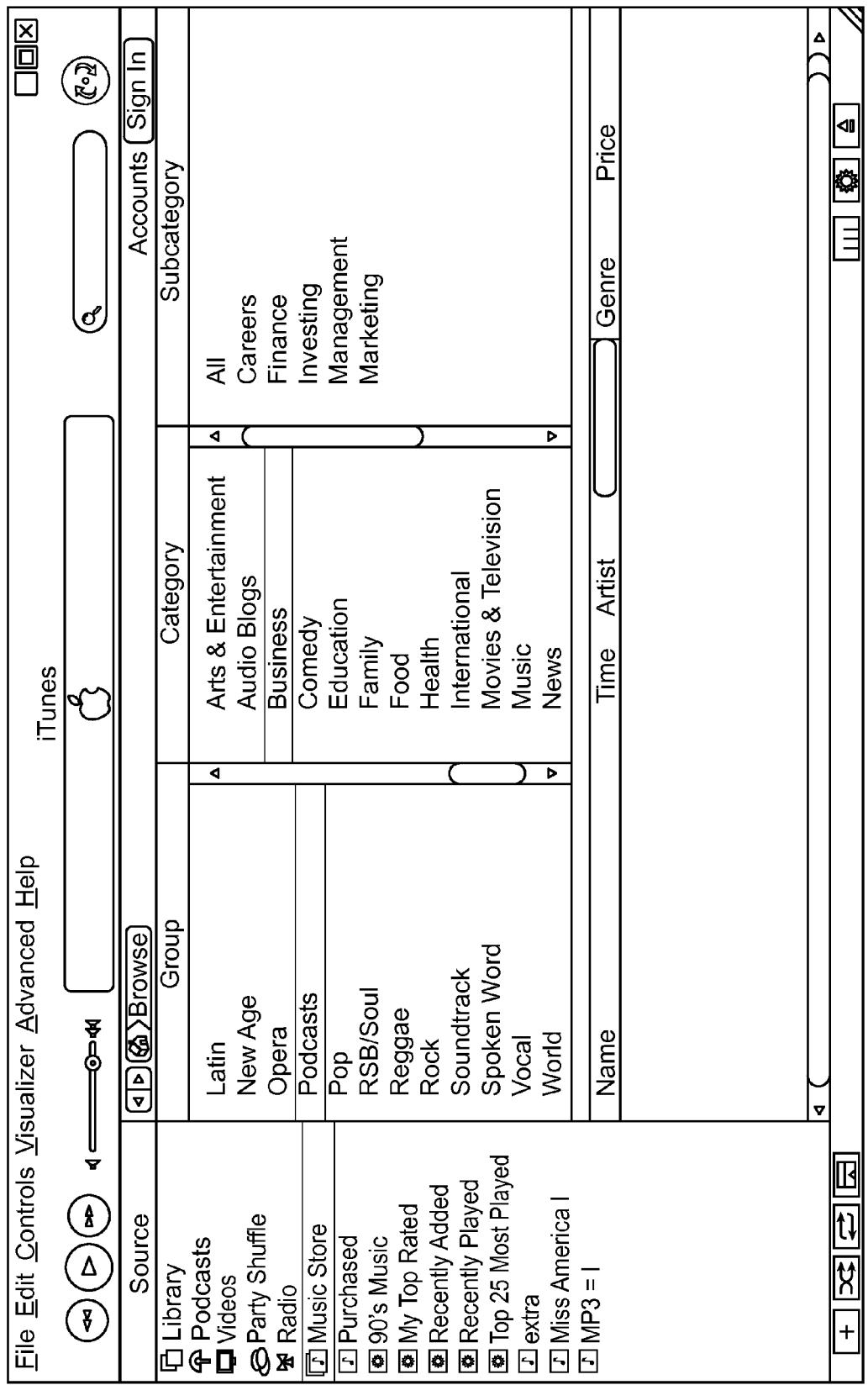
FIG. 13 is an exemplary graphical user interface enabling a user to select a category of podcasts.

FIG. 12 is an exemplary graphical user interface that may be presented to enable a user to browse an online media store. As shown, the media store can be configured so that podcasts can be searched or browsed on the media store. The search or browse functions can operate similarly to searching for albums on an on-line music store. However, in the case of podcasts, the search or browse operations are with respect to podcasts that have been published to the media store. Typically, with music, browsing is achieved by a hierarchy of levels including artist, album and song. The corollary in the case of podcasts is a hierarchy of levels including podcast category, podcast subcategory, and episodes. In this example, the podcast categories shown in the $2^{nd}$ column include "Arts & Entertainment," "Audio Blogs," "Business," "Comedy," "Education," "Family," "Food," "Health," "International," "Movies & Television," "Music," and "News." As shown in FIG. 13, upon selection of the "Business" category of podcasts, within the online media store, the subcategories "All," "Careers," "Finance," "Investing," "Management," and "Marketing" are presented in the $3^{rd}$ column.

Figure 14:
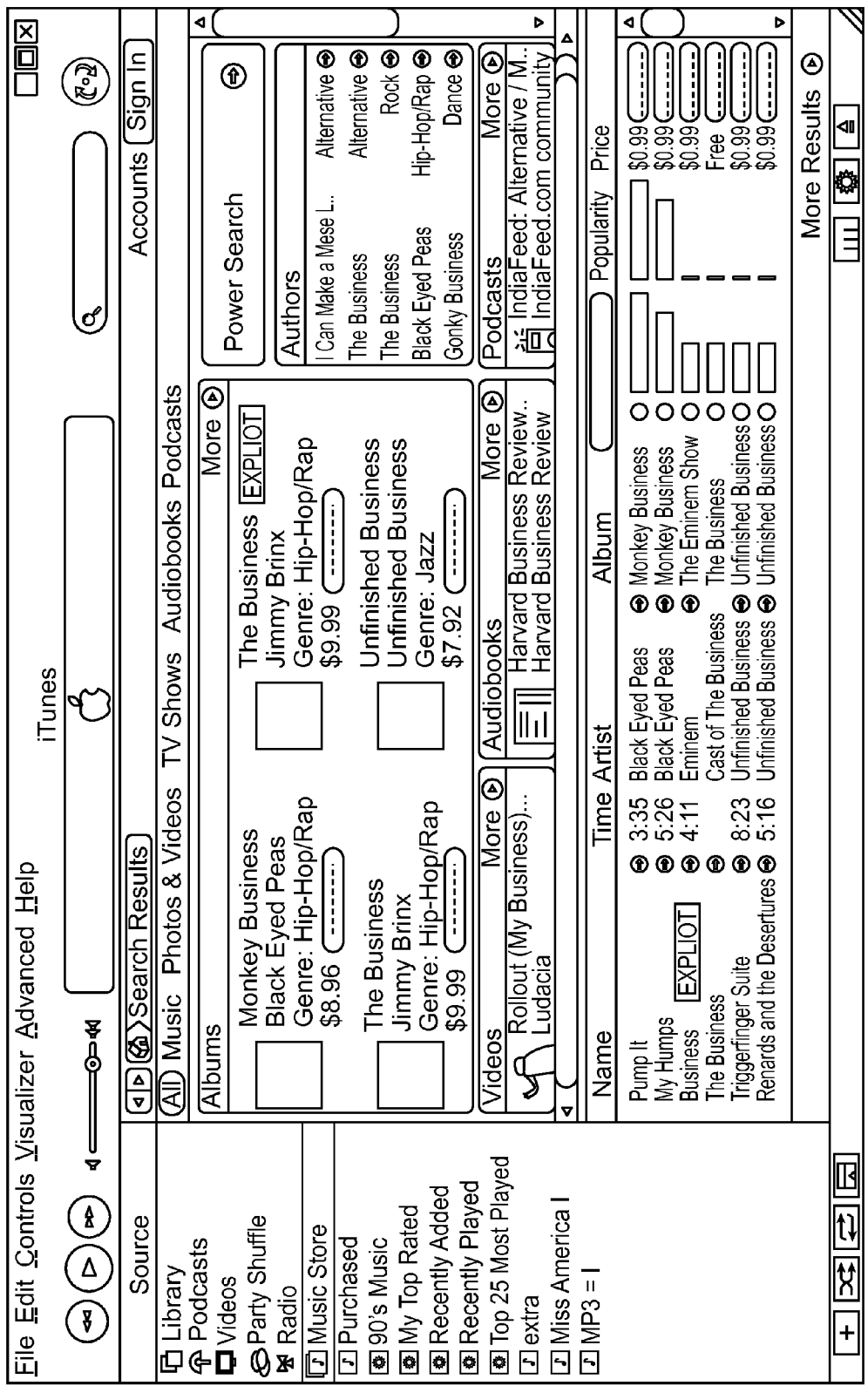
FIG. 14 is an exemplary graphical user interface enabling a user to search on the online media store.
Figure 15:
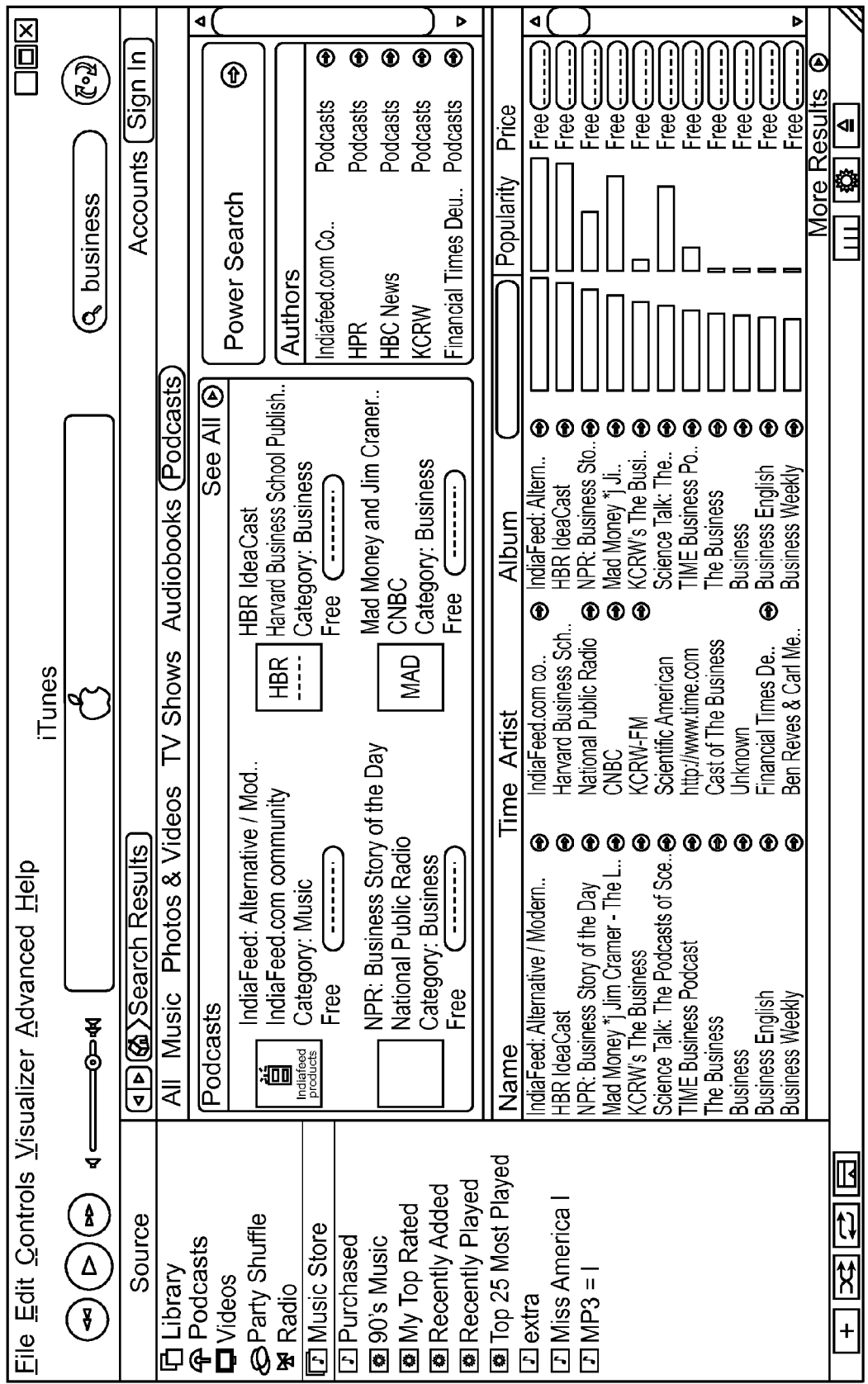
FIG. 15 is an exemplary graphical user interface enabling a user to search podcasts in the online media store.

Alternatively, a user can search podcasts. For example, the user may enter the search term "business" to search the online media store as shown in FIG. 14. Upon selection of "Podcasts" to limit the type of media being searched, the user may view the results of the search that fall within the "Podcasts" category, as shown in FIG. 15.

Figure 16:
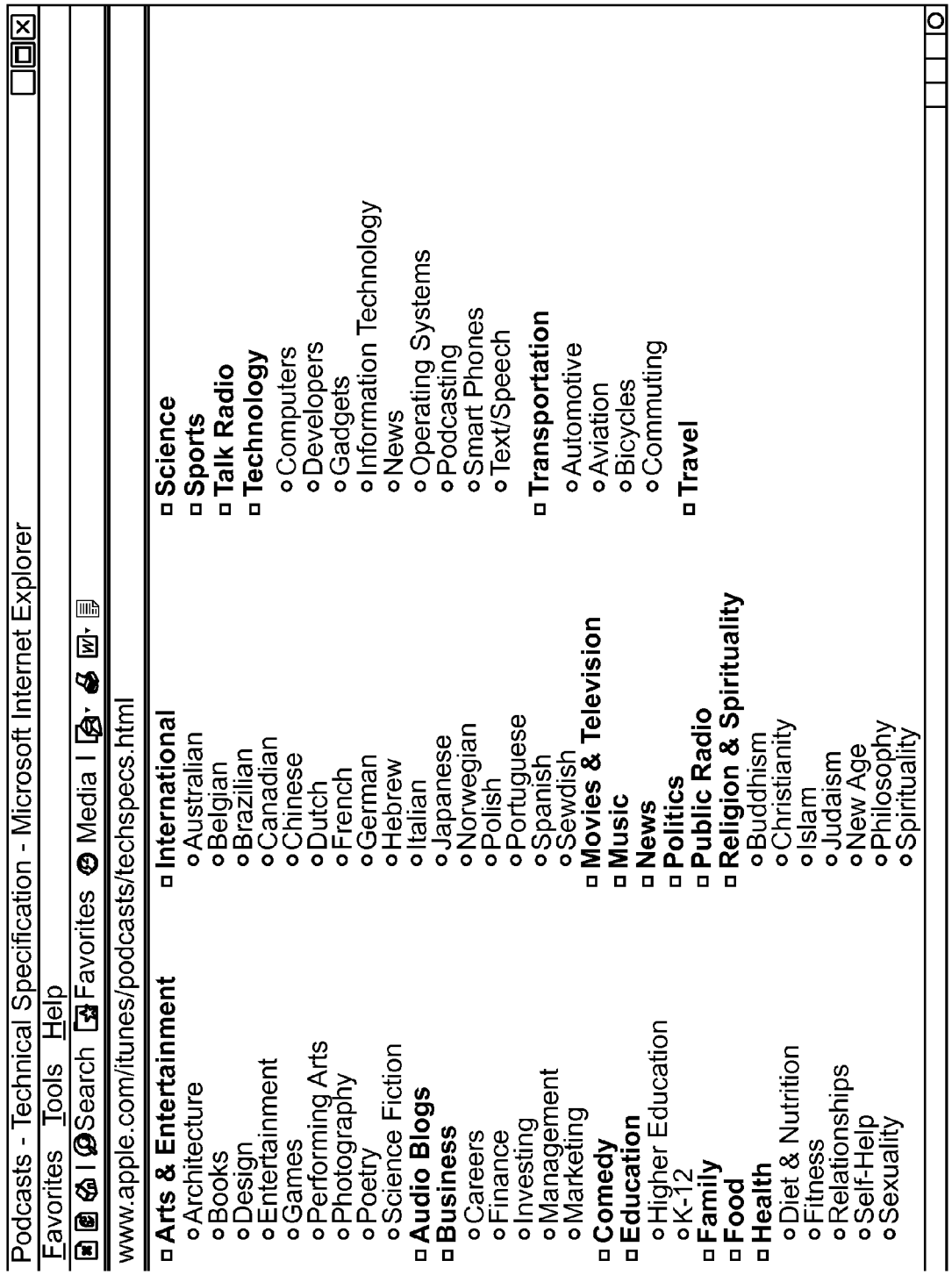
FIG. 16 is a diagram illustrating exemplary categories that may be embedded in an RSS feed using category tags in accordance with one embodiment of the invention.

FIG. 16 is a diagram illustrating exemplary categories that may be embedded in an RSS feed using category tags in accordance with one embodiment of the invention. In accordance with various embodiments of the invention, a podcast or episode may be categorized according to two or more categories. The categories may include two or more categories (existing at the same level). Moreover, these categories may include nested categories, as shown, to denote one or more subcategories of a category. For instance, the "Arts &

Entertainment" category in this example includes the subcategories "Architecture," "Books," "Design," "Entertainment," "Games," "Performing Arts," "Photography," "Poetry," and "Science Fiction." In any case, an owner of a podcast or another authorized person can insert one or more category tags into a RSS feed so as to cause categorization of the podcast or episodes thereof. Hence, at a media store that list such a podcast for purchase, the podcast can be automatically categorized for browsing, searching, etc. at the media store.

FIG. 17 is exemplary computer-readable code for generating multiple categories and nested categories in accordance with one embodiment of the invention. A single category, "Audio Blogs," is generated at 1702. Similarly, the category, "Movies & Television," is generated at 1704. Nested categories "Arts & Entertainment" and "Games" are generated at 1706, while multiple categories, "Arts & Entertainment" and "Technology" are generated at 1708. More particularly, each category, "Arts & Entertainment" and "Technology," has a corresponding sub-category, "Games" and "Computers," respectively. In addition, it is also possible to manually submit categories and sub-categories in which a podcast or episode is to be categorized.

The category tags for generating these categories and sub-categories may be referred to as "specialized" category tags, which in this example are "iTunes" category tags. In addition, it is possible that standard RSS category tags may also be present in an RSS feed. Both types of category tags may be present in an RSS feed at the feed level and at the episode level. In accordance with one embodiment, an online media store may enable podcasts to be categorized only within those categories supported by the media store, which may be represented by "specialized" category tags.

Figure 18A:
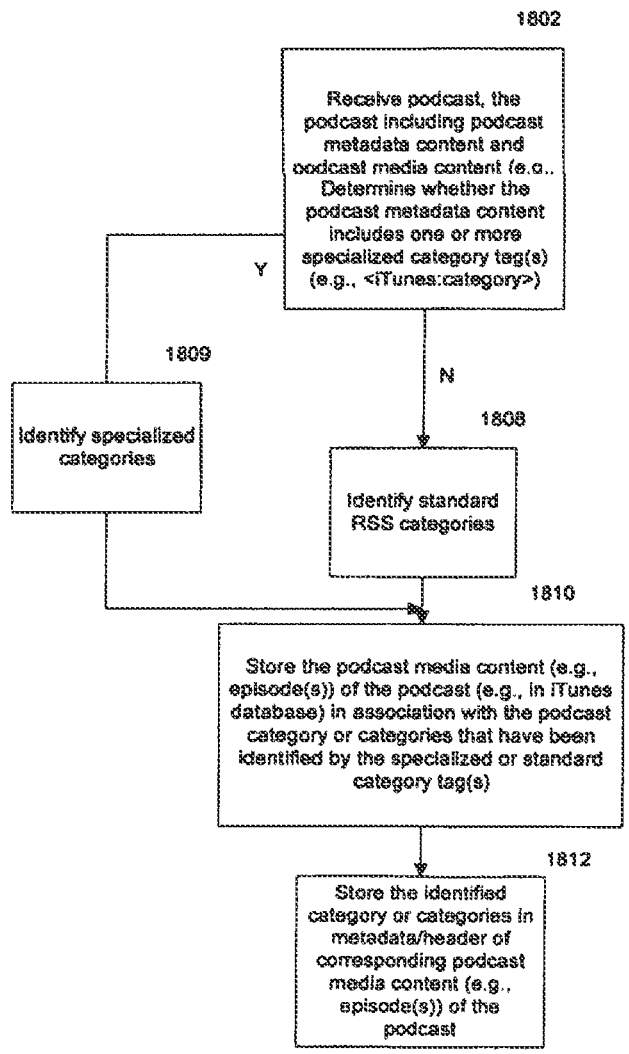
FIG. 18A is a process flow diagram illustrating a method of categorizing podcasts in accordance with one embodiment of the invention.

FIG. 18A is a process flow diagram illustrating a method of categorizing podcasts in accordance with one embodiment of the invention. The process set forth in FIG. 18A may be implemented by a server associated with the online media store, as well as a client device. Thus, a set of categories may be stored on a server associated with the online media store and/or at a client device.

As shown in FIG. 18A, when a podcast having podcast metadata content and podcast media content is received at 1802, the podcast metadata content is parsed to identify two or more categories at 1804. The podcast media content is then categorized using the identified categories.

In accordance with one embodiment, it is possible to manually submit categories in which a podcast or episode is to be categorized. In order to prevent such a podcast or episode from being "re-categorized," the podcast media content is categorized only when the podcast media content has not already been manually categorized to identify one or more corresponding categories.

In addition, while it is possible to categorize podcast media content (e.g., the entire feed or an episode) using both standard and specialized category tags, in accordance with one embodiment, it is determined whether the podcast metadata content includes one or more specialized category tags at 1806. If the podcast metadata content does not include one or more specialized category tags, the podcast media content may be categorized according to any standard category that are present at 1808. However, if the podcast metadata content does include one or more specialized category tags, the specialized category tags are identified at 1809 and the standard category tags are not used to categorize the corresponding podcast media content.

As shown at 1810, the podcast media content is stored in association with at least one of the category or categories that have been identified by the specialized or standard category tags. In accordance with one embodiment, a podcast or episode may be categorized according to a limited number of categories and/or subcategories. These categories and/or subcategories may be selected in accordance with the order in which they are identified in the podcast metadata content. In other words, those categories and subcategories that are parsed and identified first may be those that are selected for categorization. In this manner, one or more of the episodes of the podcast may be categorized differently.

Categorization may be accomplished by storing one or more categories in association with the corresponding podcast or episode(s). This may be accomplished using a relational database or other suitable data structure.

When an episode is stored at a client device or a server hosting the podcast, at least one of the identified categories may also provided in the metadata (e.g., header) of the corresponding podcast media content (e.g., episode) of the podcast at 1812. This may be accomplished, for example, by embedding one or more category indications in the metadata of an episode. By providing the categories in the metadata of each corresponding episode, the episode may be correctly categorized when it is transferred or copied to another client device such as a media device (e.g., a portable media device, such as a media player).

A client device receiving an episode that has been modified in this manner may perform a similar process to identify the relevant category or categories and any associated tags in the associated metadata. The client device may then store the episode (e.g., media file) and the associated metadata (e.g., categories) in a database.

It is important to note that the online media store will not enable podcast owners to add new categories to the online media store. Thus, in accordance with one embodiment, the online media store and associated server(s) enable a feed or single episode to be categorized according to a standard RSS tag only when it matches one of the pre-existing set of categories supported by the media store.

A client device may be implemented similarly to the online media store and therefore limit categorization to those categories supported by the media store. Alternatively, it may be desirable to enable a client device to categorize podcasts and episodes according to standard RSS tags or other categories that are not supported by the online media store. For instance, it may be desirable to enable a client to define new, personalized categories for use on a client device such as a media device (e.g., portable media player).

FIG. 18B is an exemplary graphical user interface that may be used to display information associated with a podcast or episode. As shown in this example, although multiple categories may be associated with a particular podcast or episode, only a subset of these categories may initially be presented in a user interface such as that shown in FIG. 18B. For instance, in this example, only a single category is listed in the category column for each podcast or episode entry. This may be desirable, for example, when space is limited in a particular column of the graphical user interface. However, in accordance with one embodiment, a user may click on the category column of a particular entry to view the additional categories that are associated with the particular podcast or episode.

While categories may be used to facilitate browsing and organization, keywords may also be used to support keyword searching. In order to identify a keyword, a keyword tag (e.g., <keyword> tag) may be embedded in the RSS feed. A keyword tag may be used to indicate that a podcast is to be associated with a particular keyword, or that a particular episode of the podcast is to be associated with the keyword. Since a set of one or more keyword tags may be associated with the entire podcast or an episode of the podcast, an RSS feed may include multiple keyword tags.

FIG. 19 is a process flow diagram illustrating a method of associating podcast media content with one or more keywords in accordance with one embodiment of the invention. A podcast having podcast metadata content and podcast media content is received at 1902. The podcast metadata content is then parsed to identify a set of one or more keywords at 1904. More particularly, the podcast metadata content is searched for one or more keyword tags and the value (i.e., keyword) of each of these tags is obtained from the podcast metadata content. At least a portion of the podcast media content associated with the one or more keyword tags is also identified at 1906. Information associated with the podcast corresponding to the parsed podcast metadata content is then stored (e.g., at a server associated with a web site such as an online media store) such that the set of keywords is associated with the corresponding podcast media content (e.g., feed or episode) at 1908. This association may be accomplished via a table, linked list, relational database, or other suitable data structure.

In addition, for podcasts that are hosted by the media store, a set of keywords may be embedded in the header of an electronic file containing the media content for an episode of the podcast. For instance, this may be accomplished via one or more keyword tags. This enables a client device receiving the episode to obtain the associated keywords and associate these keywords with the episode.

A client device receiving an episode that has been modified in this manner may perform a similar process to identify the keyword(s) and any associated tag(s) in the associated metadata. The client device may then store the episode (e.g., media file) and the associated metadata (e.g., keyword(s)) in a database.

The process set forth in FIG. 19 relates to a single set of keywords and corresponding podcast media content. It is important to note that a set of keywords may be associated with a feed or a single podcast. Where the set of keywords is to be associated with a feed, the set of keywords is associated with each episode of the feed. In other words, the set of keywords may be associated with one or more episodes of the feed. Thus, the podcast media content (e.g., feed or episode) with which the set of keywords is to be associated be identified at block 1906.

Even where a set of keywords is defined for a feed, a different set of keywords may also be associated with an episode of the feed. In this instance, both sets of keywords may be associated with the episode of the feed.

FIG. 20 is a process flow diagram illustrating a method of searching podcasts according to keywords in accordance with one embodiment of the invention. As shown at 2002, one or more keywords for use in searching a plurality of podcasts are obtained. These keywords may be obtained, for example, via input or selection by a user. The podcast metadata associated with a plurality of podcasts may then be searched for the one or more keywords at 2004. More particularly, the podcast metadata associated with the episode(s) of the plurality of podcasts may be searched. Podcast media content (e.g., one or more episodes) having the one or more keywords associated therewith is then identified at 2006. A list of the identified podcast media content may then be provided at 2008. This searching process may be performed by a server associated with a web site such as an online media store, as well as a client device storing information associated with a plurality of podcasts or episodes.

Although the media assets (or media items) of emphasis in several of the above embodiments were podcasts, which include audio items (e.g., audio files or audio tracks), the media assets are not limited to audio items. For example, the media assets can alternatively pertain to videos (e.g., movies) or images (e.g., photos). More generally, podcasts can also be referred to as digital multimedia assets.

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of processing a podcast, comprising:
   maintaining, by a client device, a multi-episode podcast feed with an online media store upon receiving a new podcast episode in the multi-episode podcast feed, the new podcast episode having podcast metadata content and podcast media content;
   parsing, by the client device, the podcast metadata content of the new podcast episode to identify at least one new-feed-URL tag identifying a new location of the multi-episode podcast feed that is external to the online media store;
   obtaining the new-feed-URL tag from the podcast metadata content;
   determining, by the client device, whether a user of the client device has a subscription for automatically downloading episodes of the multi-episode podcast feed;
   tagging, by the client device, additional podcast episodes downloaded by the user with the obtained new-feed-URL tag upon determining that the user is not subscribed to the multi-episode podcast feed; and
   tagging, by the client device, all previously existing podcasts in the multi-episode podcast feed and all new podcast episodes in the multi-episode podcast feed with the obtained new-feed-URL tag upon determining that the user is subscribed to the multi-episode podcast feed, wherein tagging includes substituting the new URL for an old URL previously associated with the podcast or episodes.

2. The method as recited in claim 1, further comprising:
   for each new-feed-URL tag, obtaining a new URL associated with the new-feed-URL tag from the podcast metadata content.

3. The method as recited in claim 2, further comprising:
   inserting a podcast URL tag identifying the new URL into the podcast metadata of the corresponding podcast media content.

4. The method as recited in claim 1, further comprising:
identifying an episode of the multi-episode podcast corresponding to each new-feed-URL-tag provided in the podcast metadata content.

5. The method as recited in claim 1, further comprising:
inserting the podcast URL tag identifying the new URL into metadata of the corresponding episode of the multi-episode podcast.

6. The method as recited in claim 1, wherein the episodes are stored in a database.

7. The method as recited in claim 1, wherein the tagging comprises
storing information associated with each episode of the multi-episode podcast for which a new-feed-URL tag is identified in the podcast metadata content, the information indicating that the episode belongs to the new URL, wherein the information that is stored is external to the episode.

8. The method as recited in claim 1, further comprising:
displaying a subscribe option; and
when the subscribe option is selected by a user, subscribing the user to the podcast such that the podcast is associated with the new URL.

9. The method as recited in claim 8, further comprising:
downloading at least a portion of the podcast media content of the podcast at the new URL.

10. The method as recited in claim 9, wherein downloading comprises:
downloading at least one of the episodes of the podcast at the new URL.

11. The method as recited in claim 1, wherein the new location of a new-feed-URL tag is for an episode of the podcast.

* * * * *